US008775082B2

(12) United States Patent
Bishop

(10) Patent No.: US 8,775,082 B2
(45) Date of Patent: Jul. 8, 2014

(54) FILTERED MODEL OUTPUT STATISTICS (FMOS)

(75) Inventor: Craig H. Bishop, Monterey, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1005 days.

(21) Appl. No.: 12/789,497

(22) Filed: May 28, 2010

(65) Prior Publication Data

US 2010/0305860 A1   Dec. 2, 2010

Related U.S. Application Data

(60) Provisional application No. 61/181,686, filed on May 28, 2009.

(51) Int. Cl.
*G01W 1/00* (2006.01)
*G06F 19/00* (2011.01)
*G01W 1/10* (2006.01)

(52) U.S. Cl.
CPC ..................................... *G01W 1/10* (2013.01)
USPC ............................................. 702/3; 702/179

(58) Field of Classification Search
CPC .......... G01W 1/10; G06F 17/18; G06F 19/00; G06Q 10/04
USPC ...................................................... 702/3, 179
See application file for complete search history.

(56) References Cited

PUBLICATIONS

Ide, K., Courtier,P., Ghil,M.,Lorenc,A.C., Unified Notation for Data Assimilation: Operational, Sequential and Variational May 7, 1997.*
Elbern, H., Strunk,A., Objective Analysis, Sep. 2006.*

H.R. Glahn and D.A. Lowry, "The Use of Model Output Statistics (MOS) in Objective Weather Forecasting," J. Appl. Meteor., vol. 11, Issue 8, pp. 1203-1211 (1972).
L.J. Wilson and M. Vallée, "The Canadian Updateable Model Output Statistics (UMOS) System: Design and Development Tests," Wea. Forecasting, vol. 17, Issue 2, pp. 206-222 (2002).
M.J. Schmeits, K.J. Kok, and D.H.P. Vogelezang, "Probabilistic Forecasting of (Severe) Thunderstorms in the Netherlands Using Model Output Statistics." Wea. Forecasting, vol. 20, Issue 2, pp. 134-148 (2005).
K. Rollins and J. Shaykewich, "Using willingness-to-pay to assess the economic value of weather forecasts for multiple commercial sectors," Meteorol. Appl. vol. 10, pp. 31-38 (2003).
Y. Zhu, Z. Toth, R. Wobus, D. Richardson, and K. Mylne, "The Economic Value of Ensemble-Based Weather Forecasts," BAMS, Jan. 2003, pp. 73-83.
C.H. Bishop and D. Hodyss, "Flow adaptive moderation of spurious ensemble correlations and its use in ensemble based data assimilation." Quart. J. Roy. Met. Soc. 133, pp. 2029-2044 (2007).

* cited by examiner

*Primary Examiner* — Michael Nghiem
*Assistant Examiner* — Yoshihisa Ishizuka
(74) *Attorney, Agent, or Firm* — US Naval Research Laboratory; Joslyn Barritt

(57) ABSTRACT

A computer-implemented method to provide stabilized and spatially smooth regression coefficients for weather forecast error correction from small training data sets. In accordance with the present invention, an MOS estimate of the regression coefficient calculated from a small data set can be optimally combined with a smooth prior estimate of the regression coefficient, an estimate of the spatial error covariance of that prior estimate, and an estimate of the spatial error covariance of the MOS estimate. The result is a filtered MOS (FMOS) regression coefficient which can be used to more accurately estimate and correct errors in weather forecasts even using only small data sets.

3 Claims, 9 Drawing Sheets

FILTERED MODEL OUTPUT STATISTICS (FMOS)

CROSS-REFERENCE

This application claims the benefit of priority based on U.S. Provisional Patent Application No. 61/181,686 filed on May 28, 2009, the entirety of which is hereby incorporated by reference into the present application.

TECHNICAL FIELD

The present invention relates to weather forecasting and statistical corrections of forecast errors.

BACKGROUND

Weather forecasts are of high value to a wide range of activities in agriculture, energy, transportation, defense and supply chain management. See K. Rollins and J. Shaykewich, "Using willingness-to-pay to assess the economic value of weather forecasts for multiple commercial sectors," *Meteorol. Appl.* Vol. 10, pp. 31-38 (2003); Y. Zhu, Z. Toth, R. Wobus, D. Richardson, and K, Mylne, "The Economic Value of Ensemble-Based Weather Forecasts," *BAMS, January* 2003, pp. 73-83. Of particular value are weather forecasts tailored for the particular weather related decisions that individuals, companies and organizations must make.

Such tailored weather forecasts are often provided by private weather companies such as those listed on the government web site "www(dot)weather(dot)gov/im/more.htm".

The starting point for these weather forecasts is a computer simulation or Numerical Weather Prediction (NWP) in which approximations to the equations governing the evolution of the atmosphere propagate a recently estimated weather state forward in time. In general, substantial improvements to forecasts made in this way can be achieved by comparing histories of forecasts with corresponding histories of verifying observations. By mathematically modeling the differences between the NWP and observations, it has been shown that one can produce a forecast that is significantly better than that from NWP.

Glahn and Lowry describe how the theory of multivariate linear regression can be used to correct systematically predictable aspects of weather forecast models such as the NWP, and refer to their weather forecast error corrector as Model Output Statistics (MOS). See H. R. Glahn and D. A. Lowry, "The Use of Model Output Statistics (MOS) in Objective Weather Forecasting," *J. Appl. Meteor.*, Vol. 11, Issue 8, pp. 1203-1211 (1972). The MOS forecast error corrector is estimated from a historical record of forecasts together with corresponding verifying observations. Wilson and Vallée (2002) suggest that the historical record needs to contain at least two years worth of daily weather forecasts. L. J. Wilson and M. Vallée, "The Canadian Updateable Model Output Statistics (UMOS) System: Design and Development Tests," *Wea. Forecasting*, Vol. 17, Issue 2, pp. 206-222 (2002).

MOS methods assume that on the kth day or event, the ith model forecast variable $f_i^k$ is related to the corresponding verifying analysis or observation variable $y_i^k$ via the stochastic relation $$f_i^k = a_i y_i^k + b_i + \epsilon_i^k \qquad (1)$$

where the true regression coefficients $a_i$ and $b_i$ of the model forecast variable $f_i^k$ can be considered to be the "slope" parameter and the "intercept" parameter, respectively, of a plot of the relation between f and y, and $\epsilon_i^k$ is a random number associated with the kth forecast that is statistically independent of $y_i^k$.

With a finite sample of k=1, M realizations, using MOS methods one can obtain estimates $a_i^{MOS}$ and $b_i^{MOS}$ of the regression coefficients $a_i$ and $b_i$ using the relations $$a_i^{MOS} = \frac{\left[\sum_{k=1}^{M}(f_i^k - \bar{f}_i)(y_i^k - \bar{y}_i)\right]}{\sum_{k=1}^{M}(y_i^k - \bar{y}_i)(y_i^k - \bar{y}_i)}, \qquad (2)$$

$$b_i^{MOS} = \bar{f}_i - a_i^{MOS}\bar{y}_i,$$

$$\text{where } \bar{f}_i = \frac{1}{M}\sum_{k=1}^{M}f_i^k, \bar{y}_i = \frac{1}{M}\sum_{k=1}^{M}y_i^k$$

where $f_i^k$ is the ith model forecast variable and $y_i^k$ is the verifying analysis/observation variable in Equation (1) above and $\bar{f}_i$ and $\bar{y}_i$ are the average values over M realizations.

If two years of historical data are available for the forecast model of interest, MOS can be relied on to provide significant forecast improvements. However, in the continuing effort to improve weather forecasting models, significant changes are frequently made to the forecasting model. The MOS equations developed for an old model may be entirely inappropriate for the changed new model. Consequently, after every model change, new MOS equations need to be developed. For example, typical model changes have included increases in model resolution, changes in the representation of sub subgrid scale physics, and changes in the forcings associated with radiation.

If sufficient manpower and computer resources were available, a historical record of the performance of the new system required for new MOS equations could be generated fairly quickly by running the new system on historical data. However, such resources are generally unavailable to the responsible parties. Instead, a historical record of two years is usually obtained by archiving forecasts and the corresponding verifying analyses and forecasts in real time. Using such a method, a two-year historical record would require two years' time to compile.

This state of affairs led Wilson and Vallée (2002), supra, to propose an Updateable Model Output Statistics (UMOS) system that blended regression equations based on earlier versions of the model with equations based on more recent versions of the model. UMOS implicitly assumes that significant model changes are typically separated by more than two years. However, this assumption is not satisfied at many forecasting centers. For example, the limited area weather forecasting models of the U.S. Navy are typically deployed in a specific theatre for a period between two weeks and two years. In principle, new MOS equations would need to be developed for each unique theatre in which the forecasting model is deployed. Hence, the Navy's deployment periods are too short for the estimated regression coefficients to stabilize, and any attempt to estimate the regression coefficients using MOS or UMOS with such a small data set will result in very noisy regression coefficients.

One alternative would be to assume that regression coefficients were identical in various sub-regions of the model. This was assumed by, for example, M. J. Schmeits, K. J. Kok, and D. H. P. Vogelezang, "Probabilistic Forecasting of (Severe) Thunderstorms in the Netherlands Using Model Output Statistics." *Wea. Forecasting*, Vol. 20, Issue 2, pp. 134-148

(2005). Although this approach will give stable coefficients for small data training sets it does not converge to the (superior) MOS coefficients in the limit of infinite training data. In addition, the MOS equations are likely to have erroneous jumps between sub-regions.

Thus, there is a need for a method for producing less noisy MOS regression coefficients that can be used with small data sets.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a computer-implemented method to provide stabilized and spatially smooth regression coefficients for weather forecast error correction from small training data sets. In accordance with the present invention, the MOS estimates $a_i^{MOS}$ and $b_i^{MOS}$ of regression coefficients calculated from a small data set can be optimally combined with a smooth prior estimate of the regression coefficient, an estimate of the spatial error covariance of that prior estimate, and an estimate of the spatial error covariance of the MOS estimate to produce a set of Filtered MOS (FMOS) regression coefficients $a^{FMOS}$ and $b^{FMOS}$:

$$a^{FMOS} = a^{prior} = G_a(G_a = R_a)^{-1}(a^{MOS} - a^{prior})$$

$$b^{FMOS} = b^{prior} = G_b(G_b = R_b)^{-1}(b^{MOS} - b^{prior})$$

where $$(a^{MOS})^T = [a_1^{MOS}, a_2^{MOS}, \ldots, a_n^{MOS}]$$

and $$(b^{MOS})^T = [b_1^{MOS}, b_2^{MOS}, \ldots, b_n^{MOS}]$$

are n-vectors listing all the estimates of $a_i^{MOS}$ and $b_i^{MOS}$ for $i=1, \ldots, n$, n being the number of grid points defining the field of interest $a^{prior}$ and $b^{prior}$ are n-vectors listing prior estimates or guesses of the regression coefficients a and b over that field, $G_a$ and $G_b$ define the error covariances of $a^{prior}$ and $b^{prior}$ and $R_a$ and $R_b$ define the error covariance of $a^{MOS}$ and $b^{MOS}$.

These filtered regression coefficients $a^{FMOS}$ and $b^{FMOS}$ obtained in accordance with the present invention can be used to more accurately estimate and correct errors in weather forecasts even using only small data sets.

BRIEF DESCRIPTION OF THE DRAWINGS

FIGS. 2A and 2B illustrate an exemplary set of MOS estimates (prior art) of the true a-field and the error in this estimate, respectively. FIG. 2C shows a plot of an exemplary true a-field. FIG. 2D shows the true spatial covariance function of the a-field. FIGS. 2E and 2F illustrate estimated error covariances of the prior and MOS estimates of a, respectively. FIGS. 2G and 2H, respectively, illustrate an exemplary set of Filtered MOS (FMOS) estimates of a obtained in accordance with the present invention and the errors in the FMOS estimates as compared to the true a-field.

FIGS. 3A and 3B, illustrate an exemplary set of MOS estimates (prior art) of the true b-field and the error in this estimate, respectively. FIG. 3C shows a plot of an exemplary true b-field. FIG. 3D shows the true spatial covariance function of the b-field. FIGS. 3E and 3F illustrate estimated error covariances of the prior and MOS estimates of b, respectively. FIGS. 3G and 3H, respectively, illustrate an exemplary set of FMOS estimates of b obtained in accordance with the present invention and the errors in the FMOS estimates as compared to the true b-field.

DETAILED DESCRIPTION

Figure 1:
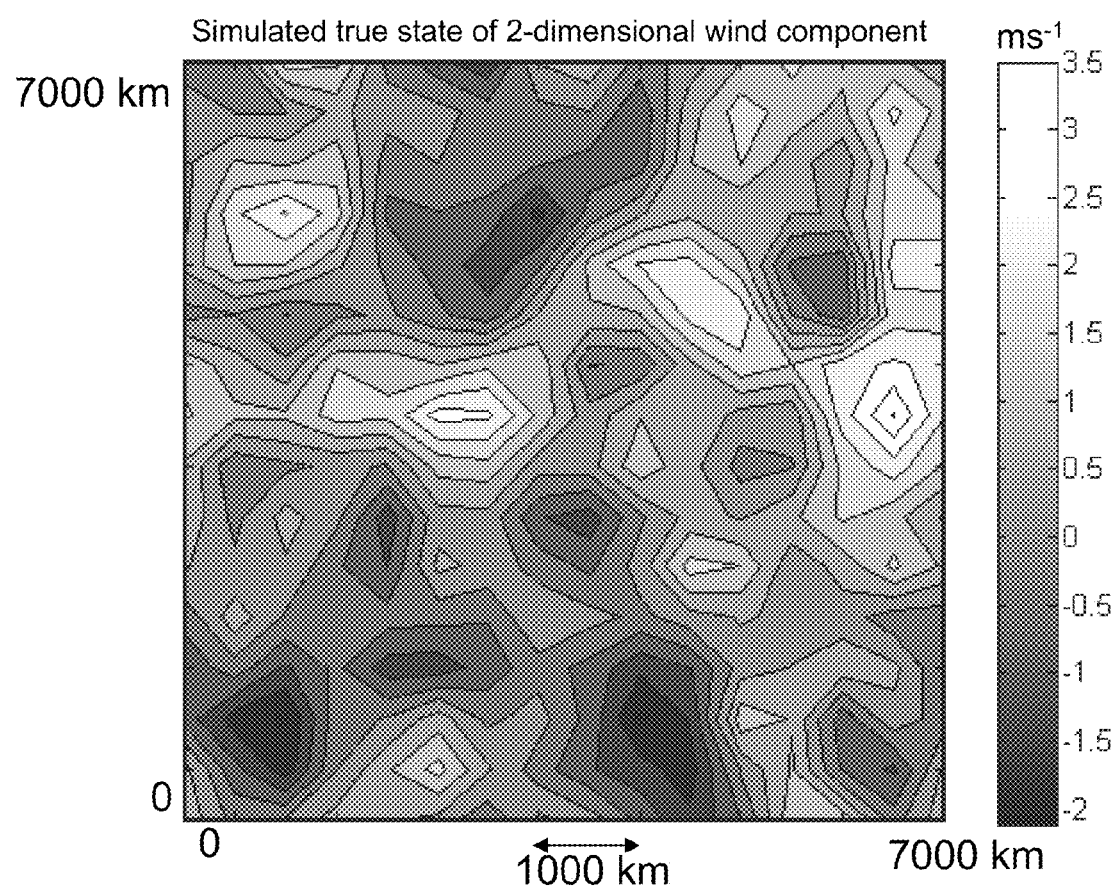
FIG. 1 depicts an exemplary random random meridional wind field (v) generated using simulated observed idealized weather fields.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a computer-implemented method for statistically deriving weather forecast improvement functions from small training data sets. As will be appreciated by one skilled in the art, a method for providing stabilized and spatially smooth regression coefficients for weather forecast error correction in accordance with the present invention can be accomplished by executing one or more sequences of instructions contained in computer-readable program code read into a memory of one or more general or special-purpose computers configured to execute the instructions, wherein MOS regression coefficients that have large errors because of the paucity of training data are transformed into a set of filtered modeled output statistics (FMOS) regression coefficients using information about the spatial covariance of the prior estimate of the coefficients and the spatial error covariance of the MOS estimate of the coefficients. The addition of the spatial covariance information causes the FMOS coefficients to be much more accurate than the noisy MOS coefficients from which they were derived.

As described in more detail below, the FMOS technique of the present invention stabilizes and spatially smoothes noisy regression coefficients produced by conventional MOS techniques using small data sets by optimally combining a data-poor MOS estimate with a prior estimate based on an assumption, for example, that model forecasts are unbiased. To optimally combine these two estimates, information about the spatial covariance of the prior estimate of the coefficients and the spatial error covariance of the MOS estimate of the coefficients is used. An estimate of the spatial error covariance G of the prior estimate can be obtained from a spectral analysis of the (noisy) difference between the data-poor MOS estimate and the prior estimate, and an estimate of the spatial error covariance R of the data-poor MOS estimate can obtained from a spatial analysis of the equations governing the grid-point wise error variance of the MOS equations. In accordance with the present invention, these error covariances G and R are combined with the MOS coefficients to produce a set of filtered MOS regression coefficients which can be used to more accurately estimate and correct errors in weather forecasts even using only small data sets.

As noted above, at the kth event (e.g., an observation day) a forecast $f_i^k$ at the ith grid point from the true state $y_i^k$ can be estimated from Equation (1) set forth above and replicated here for convenience:

$$f_i^k = a_i y_i^k + b_i + \epsilon_i^k. \quad (1)$$

where the regression coefficients $a_i$ and $b_i$ of the modeled forecast variable $f_i^k$ can be considered to be the "slope" parameter and the "intercept" parameter, respectively, of a plot of the relation between f and y, and $\epsilon_i^k$ is a random number associated with the kth forecast that is statistically independent of $y_i^k$. Although Equation (1) expresses the forecast as function of the observation rather than the observation as a function of the forecast, one skilled in the art would readily understand that the methods described herein can be applied equally well to counterparts of Equation (1) that express the observation as a function of the forecast. It may be noted, however, that the form of Equation (1) presented herein may be preferred when one is attempting to produce reliable probabilistic forecasts from ensemble forecasts. See C. H. Bishop and K. T. Shanley, "Bayesian Model Averaging's problematic treatment of extreme weather and a paradigm shift that fixes it," Mon. Wea. Rev. 136, pp. 4641-4652 (2008).

Also as noted above, Equation (1) contains a set of estimated regression coefficients $a_i^{MOS}$ and $b_i^{MOS}$ can be calculated using Equation (2) previously presented above and replicated here for convenience:

$$a_i^{MOS} = \frac{\left[\sum_{k=1}^{M}(f_i^k - \bar{f}_i)(y_i^k - \bar{y}_i)\right]}{\sum_{k=1}^{M}(y_i^k - \bar{y}_i)(y_i^k - \bar{y}_i)}, \quad (2)$$

$$b_i^{MOS} = \bar{f}_i - a_i^{MOS} \bar{y}_i,$$

where $\bar{f}_i = \frac{1}{M}\sum_{k=1}^{M} f_i^k, \bar{y}_i = \frac{1}{M}\sum_{k=1}^{M} y_i^k$ However, there often are significant errors in the estimated regression coefficients $a_i^{MOS}$ and $b_i^{MOS}$, particularly in cases where only a small data set is present.

The present invention provides a method to improve on the MOS estimates of the regression coefficients $a_i$ and $b_i$, which in turn can be used to provide more accurate weather forecasts and modeling, even in cases where only small data sets are available. In accordance with the present invention, each MOS estimated coefficient can be combined with a smooth prior estimate of that regression coefficient, an estimate of the spatial error covariance of that prior estimate, and an estimate of the spatial error covariance of the MOS estimate.

The result is a set of filtered MOS (FMOS) regression coefficients $a^{FMOS}$ and $b^{FMOS}$:

$$a^{FMOS} = a^{prior} = G_a(G_a = R_a)^{-1}(a^{MOS} - a^{prior})$$

$$b^{FMOS} = b^{prior} = G_b(G_b = R_b)^{-1}(b^{MOS} - b^{prior}) \quad (3)$$

where $$(a^{MOS})^T = [a_1^{MOS}, a_2^{MOS}, \ldots, a_n^{MOS}]$$

and $$(b^{MOS})^T = [b_1^{MOS}, b_2^{MOS}, \ldots, b_n^{MOS}]$$

are n-vectors listing all the estimates of $a_i^{MOS}$ and $b_i^{MOS}$ for $i = 1, \ldots, n$, n being the number of grid points defining the field of interest $a^{prior}$ and $b^{prior}$ are n-vectors listing prior estimates or guesses of the regression coefficients a and b over over that field, $G_a$ and $G_b$ define the error covariances of $a^{prior}$ and $b^{prior}$ and $R_a$ and $R_b$ define the error covariance of $a^{MOS}$ and $b^{prior}$ as described in more detail below. The improved regression coefficients $a^{FMOS}$ and $b^{FMOS}$ can be used to more accurately estimate and correct errors in weather forecasts even using only small data sets.

A method for estimating $a^{FMOS}$ and $b^{FMOS}$ in accordance with the present invention will now be described in detail.

As described above, the error covariances $G_a$ and $G_b$ give the error covariance of the prior estimates $a^{prior}$ and $b^{prior}$. n accordance with the invention, $G_a$ and $G_b$ can be defined as $$G_a = \left\langle (a^{prior} - a)(a^{prior} - a)^T \right\rangle,$$

$$G_b = \left\langle (b^{prior} - b)(b^{prior} - b)^T \right\rangle, \quad (4)$$

where a and b are n-vectors listing the true values of the coefficients $a_i$ and $b_i$ and $a^{prior}$ and $b^{prior}$ are n-vectors listing prior estimates or guesses of the regression coefficients. As noted above, after a change in the weather forecast model, one would typically assume that $(a^{prior})^T = [1, 1, \ldots, 1]$ and $(b^{prior})^T = [0, 0, \ldots, 0]$ because, in large measure, the purpose of model changes is to make forecasts unbiased and to make the approximation $f_i^k \approx y_i^k$ as accurate as possible. Thus, in the examples presented here, $a^{prior}$ and $b^{prior}$ will be based on the assumption that the model is unbiased, where all of the elements of $a^{prior}$ are set equal to unity and all of the elements of $b^{prior}$ are set equal to zero. However, in general $a^{prior}$ and $b^{prior}$ can represent any prior guess of the regression coefficients a and b.

An exemplary method for estimating the covariances $G_a$ and $G_b$ in accordance with the present invention will now be described. Since the estimation method is the same for both $G_a$ and $G_b$, only the method for estimating $G_a$ will be described here, as one skilled in the art would understand how to estimate $G_b$ from the description herein. In addition, one skilled in the art would readily appreciate that other covariance matrices $G_a$ and $G_b$ and methods for estimating thereof also can be used, and any appropriate covariance matrices $G_a$ and $G_b$ and/or methods for estimating thereof can be used in estimating regression coefficients $a^{FMOS}$ and $b^{FMOS}$ in accordance with the present invention.

Let an n×n matrix E list the real set of discrete orthonormal sinusoidal/cosinusoidal basis functions for the domain of interest and $E^T$ be the transpose of E. These basis functions can be readily accessed via Fast Fourier Transform subroutine libraries known in the art. If the domain under consideration lies on a sphere, then a basis of spherical harmonics should be used rather than sinusoids. If the assumption of periodicity is invalid on a finite domain then a pure sinusoid or pure cosinusoid basis should be used.

It can be assumed that $$G_a = E(\text{diag}(g))E^T \quad (5)$$

The term diag(g) in Equation (5) is a diagonal matrix whose non-zero elements are given by $$g_{k,l} = B\exp(-b^2(k^2 + l^2)),$$

$$g^T = [g_{k,l}, k=1, \ldots nk, l=1, \ldots nl] \quad (6)$$

where the subscripts k and l refer to a sinusoidal basis function with wavenumber k in the x-direction and wavenumber l in the y-direction.

The broader the covariance functions associated with the covariance matrices $G_a$ and $G_b$, the smaller the historical data set required for FMOS to yield accurate regression coefficients. This is because when these covariance functions are broad, Equation (6) can remove the noise from the MOS estimates of a and b by spatially averaging the noisy MOS estimates. The breadth of the covariance functions depends on the positive definite parameter b used in deriving the diagonal matrix elements $g_{k,l}$, with a larger value of b leading to broader covariance functions and a smaller value of b leading to tighter covariance functions. The parameter B used in defining the diagonal matrix elements $g_{k,l}$ determines the amplitude of the covariance functions, with larger (smaller) B values giving larger (smaller) amplitudes.

The prime objective of the estimation procedure described here is to choose B and b so that the vector ($a^{prior}-a$) would appear to be a random draw of an n-vector from a normal distribution with covariance $G_a$. In other words, g should be chosen so that the assumption $$(a^{prior}-a)=E[\text{diag}(g)]^{1/2}\xi, \xi \sim N(0,I) \quad (7)$$

where $\xi$ is some random normal vector with mean 0 and covariance I, is as plausible as possible.

To do this, we begin by taking the transform $$\alpha = E^T(a^{prior}-a^{MOS}), d=\alpha \odot \alpha \quad (8)$$

where the symbol $\odot$ indicates the elementwise vector product. The transform yields the vector $\alpha$ of spectral coefficients defining $a^{prior}$ and $a^{MOS}$. Since $\alpha$ is real and $d=\alpha \odot \alpha$, there are no negative elements in d. For a two-dimensional domain, each element $d_{k,l}$ gives the square of the coefficient of the sinusoid with wavenumber k in the x-direction and wavenumber l in the y-direction.

To make the assumption in Equation (7) plausible, the parameters B and b in in Equation (6) can be chosen to minimize the function $$J = \frac{1}{2}\sum_{k=1}^{n_k}\sum_{l=1}^{n_l}((g_{k,l})-(d_{k,l}))^2 \quad (9)$$

by setting $$\frac{\partial J}{\partial B} = \sum_{k=1}^{n_k}\sum_{l=1}^{n_l}\frac{\partial g_{k,l}}{\partial B}((g_{k,l})-(d_{k,l})) = 0$$

and $$\frac{\partial J}{\partial (b^2)} = \sum_{k=1}^{n_k}\sum_{l=1}^{n_l}\frac{\partial g_{k,l}}{\partial (b^2)}((fg_{k,l})-(d_{k,l})) = 0.$$

We also note that from Equation (6)

$$(g_{k,l}) = B\exp[-b^2(k^2+l^2)] \quad (10)$$

$$\frac{\partial g_{k,l}}{\partial B} = \exp[-b^2(k^2+l^2)],$$

$$\frac{\partial g_{k,l}}{\partial (b^2)} = -(k^2+l^2)B\exp[-b^2(k^2+l^2)]$$

so that using the relations in Equation (10) in Equation (9) gives us $$\frac{\partial J}{\partial B} = \sum_{k=1}^{n_k}\sum_{l=1}^{n_l}\exp[-b^2(k^2+l^2)](B\exp[-b^2(k^2+l^2)]-(d_{k,l})) = 0 \quad (11)$$

and $$\frac{\partial J}{\partial (b^2)} = \quad (12)$$

$$\sum_{k=1}^{n_k}\sum_{l=1}^{n_l}-\binom{k^2+}{l^2}B\exp\left[-b^2\binom{k^2+}{l^2}\right]\binom{B\exp[-b^2(k^2+l^2)]-}{(d_{k,l})} = 0$$

$$\Rightarrow \sum_{k=1}^{n_k}\sum_{l=1}^{n_l}-\binom{k^2+}{l^2}\exp\left[-b^2\binom{k^2+}{l^2}\right]\binom{B\exp[-b^2(k^2+l^2)]-}{(d_{k,l})} = 0$$

The derivatives $$\frac{\partial J}{\partial B} \text{ and } \frac{\partial J}{\partial (b^2)}$$

can then be used in any suitable minimization algorithm to find the values of B and $b^2$ that minimize J. With B and b defined in this way, the optimum error covariance $G_a=E(\text{diag}(g))E^T$ can then be estimated using Equations (5) and (6) described above.

Similarly to $G_a$, the error covariance matrix $G_b$ is estimated as $G_b=E(\text{diag}(g^b))E^T$, where E is an n×n matrix listing a real set of discrete orthonormal sinusoidal/cosinusoidal basis functions for domain of interest, $E^T$ is the transpose of E, $\text{diag}(g^b)$ is a diagonal matrix whose non-zero elements are given by $$g^b_{k,l}=A\exp(-a^2(k^2+l^2)),$$

$$g^{bT}=[g^b_{k,l}, k=1,\ldots,n_k, l=1,\ldots,n_l] \quad (12.1)$$

where k and l are sinusoidal basis functions with wavenumber k in the x-direction and wavenumber l in the y-direction, and where A and a minimize the function $$J^b = \frac{1}{2}\sum_{k=1}^{n_k}\sum_{l=1}^{n_l}((g^b_{k,l})-(d^b_{k,l}))^2 \quad (12.2)$$

by setting $$\frac{\partial J^b}{\partial A} = \sum_{k=1}^{n_k}\sum_{l=1}^{n_l}\frac{\partial g^b_{k,l}}{\partial A}((g^b_{k,l})-(d^b_{k,l})) = 0$$

and $$\frac{\partial J^b}{\partial (a^2)} = \sum_{k=1}^{n_k}\sum_{l=1}^{n_l}\frac{\partial g^b_{k,l}}{\partial (a^2)}((g^b_{k,l})-(d^b_{k,l})) = 0,$$

where $d^b_{k,l}$ is the element of the vector $d^b$ corresponding to wavenumber k (x-direction) and wavenumber l (y-direction) where $$d^b=[E^T(b^{prior}-b^{MOS})]\odot[E^T(b^{prior}-b^{MOS})]. \quad (12.2)$$

Note that the aforementioned derivatives of $J^b$ take the specific form $$\frac{\partial J^b}{\partial A} = \sum_{k=1}^{n_k}\sum_{l=1}^{n_l} \exp[-a^2(k^2+l^2)](A^b\exp[-a^2(k^2+l^2)]-(d^b_{k,l})) = 0 \quad (12.3)$$

and $$\frac{\partial J^b}{\partial(a^2)} = \quad (12.4)$$

$$\sum_{k=1}^{n_k}\sum_{l=1}^{n_l} -(k^2+l^2)A\exp[-a^2(k^2+l^2)](A\exp[-a^2(k^2+l^2)] -$$

$$(d^b_{k,l})) = 0 \Rightarrow \sum_{k=1}^{n_k}\sum_{l=1}^{n_l} -(k^2+l^2)\exp[-a^2(k^2+l^2)]$$

$$(A\exp[-a^2(k^2+l^2)]-(d^b_{k,l})) = 0.$$

The derivatives $$\frac{\partial J^b}{\partial A} \text{ and } \frac{\partial J^b}{\partial(a^2)}$$

can then be used in any suitable minimization algorithm to find the values of A and $a^2$ that minimize $J^b$. With A and a defined in this way, the vector $g^b$ and the corresponding optimum error covariance $G_b = E(\text{diag}(g^b))E^T$ are also defined.

As can be seen from Equation (3) and as described above, in addition to $G_a$ and $G_b$, the method for estimating improved forecast error regression coefficients $a^{FMOS}$ and $b^{FMOS}$ in accordance with the present invention also utilizes a second set of error covariance equations $R_a$ and $R_b$, which define the error covariance of the MOS estimates of the regression coefficients $a^{MOS}$ and $b^{MOS}$:

$$R_a = \langle (a^{MOS}-a)(a^{MOS}-a)^T \rangle,$$

$$R_b = \langle (b^{MOS}-b)(b^{MOS}-b)^T \rangle \quad (13)$$

It should be noted that unlike the error covariances $G_a$ and $G_b$, each of the error covariance matrices $R_a$ and $R_b$ must be estimated separately.

As described in more detail below, these spatial error covariance matrices can be estimated from an analysis of the known equations defining the error variance of estimates of the regression coefficients at each grid point. The aspects of this analysis relating to spatial covariances are new and are not found in the prior art. In addition, the magnitude of the elements in $R_a$ and $R_b$ tend to zero as the length of the historical record M used as a training data set tends to infinity so that in this limit, $b^{FMOS} = b^{FMOS} = b$ and $a^{FMOS} = a^{MOS} = a$.

An exemplary method for estimating $R_a$ and $R_b$ is presented below. However, as in the case of $G_a$ and $G_b$, other forms of $R_a$ and $R_b$ and methods for estimating thereof may exist and any appropriate form and/or method for estimation may be used in the method for estimating the regression coefficients $a^{FMOS}$ and $b^{FMOS}$ in accordance with the present invention.

We begin with the estimation of $R_b$. From Equations (1) and (3) set forth above, $$\bar{f}_i = a_i \bar{y}_i + b_i + \bar{\zeta}_i => b_i = \bar{f}_i - a_i \bar{y}_i - \bar{\zeta}_i. \quad (14)$$

since $b_i^{MOS} = \bar{f}_i - a_i \bar{y}_i$, $b_i^{MOS} - b_i = \bar{\zeta}_i$, where the overbar indicates a sample mean over the M training events, e.g., $$\bar{f}_i = \frac{1}{M}\sum_{m=1}^{M} f_i^m.$$

In conventional methods, the element $\{R_b\}_{ij}$ on the ith row and jth column of $R_b$ can be estimated using the values of $b_i^{MOS}$ and $(b_i^{MOS}-b_i)$ from Equation (14) above:

$$\{R_b\}_{ij} = \langle (b_i^{MOS}-b_i)(b_j^{MOS}-b_j) \rangle \quad (15)$$

$$= \langle \bar{\zeta}_i \bar{\zeta}_j \rangle$$

$$= \frac{\langle \zeta_i \zeta_j \rangle}{M}$$

$$\approx \frac{\frac{1}{M-1}\sum_{m=1}^{M}(\zeta_i^m - \bar{\zeta}_i)(\zeta_j^m - \bar{\zeta}_j)}{M}$$

where the triangular brackets indicate the expectation operator known in the art.

Using the approximation $\zeta\text{hd }i^m \approx f_i^m - a_i^{MOS} y_i^m - b_i^{MOS}$ in Equation (15), an estimate of the covariance between the error of the bias estimate at the ith grid point and the bias estimate at the jth grid point can be obtained.

The approximation given by Equation (15) is a trivial extension of formulae well known in the field of multivariate regression. However, this approximation is extremely poor when the number of data sets M is smaller than the number of grid-points in the horizontal domain, and unfortunately, this data-poor state of affairs is what would typically be expected in meteorological applications.

Consequently, in accordance with the present invention, $R_b$ is assumed to be diagonal in spectral space and can be estimated using the relation $$R_b \approx E\left\{\text{diag}\left\{E^T\left\{\frac{\frac{1}{M-1}\sum_{m=1}^{M}(\zeta^m - \bar{\zeta})(\zeta^m - \bar{\zeta})}{M}\right\}E\right\}\right\}E^T \quad (16)$$

where $\xi^m \approx f^m - a^{MOS} \odot y^m - b^{MOS}$ gives the vector of differences between the forecast and the MOS prediction of the forecast from the mth event and $$\bar{\zeta} = \frac{1}{M}\sum_{m=1}^{M} \zeta^m.$$

The symbol "$\odot$" denotes the elementwise vector product. The symbol $\{R_b\}_{ij}$ hereafter denotes the element of the matrix $R_b$ lying on its ith row and jth column Note that in both of Equations (15) and (16), the magnitude of the elements of $R_b$ approaches zero as M tends to infinity; i.e., the error in the MOS coefficients $a^{MOS}$ and $b^{MOS}$ as compared to the true regression coefficients a and b goes to zero as the number of training events M goes to infinity. However, when the number of training data sets M is significantly smaller than the number of grid points of interest, this approximation of the regression coefficient $R_b$ provides results that are far superior than that obtained using conventional methods.

As noted above, $R_a$ and $R_b$ must be estimated separately, and so having obtained an estimate of $R_b$, we can now estimate $R_a$.

As described above, the forecast variable $f_i^m$ is related to the corresponding verifying analysis/observation variable $y_i^m$ by $f_i^m = a_i y_i^m + b_i + \zeta_i^m$. Therefore, $$\overline{(f_i - \bar{f}_i)(y_i - \bar{y}_i)} = a_i \overline{(y_i - \bar{y}_i)^2} + \overline{\zeta_i(y_i - \bar{y}_i)} \quad (17)$$

where the barred variables $\bar{f}_i$ and $\bar{y}_i$ are mean variables as described above.

Rearranging Equation (17), we get $$a_i = [\overline{(f_i - \bar{f}_i)(y_i - \bar{y}_i)} - \overline{\zeta_i(y_i - \bar{y}_i)}]/\overline{(y_i - \bar{y}_i)^2} \quad (18)$$

From Equation (2) described above, the value of $a_i^{MOS}$ can be derived:

$$a_i^{MOS} = [\overline{(f_i - \bar{f}_i)(y_i - \bar{y}_i)}]/\overline{(y_i - \bar{y}_i)^2}, \quad (19)$$

Using Equations (18) and (19) above, we can derive $a_i^{MOS} - a_i$:

$$a_i^{MOS} - a_i = \overline{\zeta_i(y_i - \bar{y}_i)}/\overline{(y_i - \bar{y}_i)^2} \quad (20)$$

and therefore can derive $R_a$:

$$\{R_a\}_{ij} = \langle (a_i^{MOS} - a_i)(a_j^{MOS} - a_j) \rangle \quad (21)$$

$$= \langle \zeta_i(y_i - \bar{y}_i)\zeta_j(y_j - \bar{y}_j) / [(y_i - \bar{y}_i)^2(y_j - \bar{y}_j)^2] \rangle$$

$$= \left\langle \frac{\left[\frac{1}{M}\sum_{m=1}^{M}\zeta_i^m(y_i^m - \bar{y}_i)\right]\left[\frac{1}{M}\sum_{k=1}^{M}\zeta_j^k(y_j^k - \bar{y}_j)\right]}{\left[\frac{1}{M}\sum_{m=1}^{M}(y_i^m - \bar{y}_i)^2\right]\left[\frac{1}{M}\sum_{k=1}^{M}(y_j^m - \bar{y}_j)^2\right]} \right\rangle$$

$$\approx \frac{\left\{\left[\frac{1}{M^2}\sum_{k=1}^{M}\sum_{m=1}^{M}\langle \zeta_i^m \zeta_j^k (y_i^m - \bar{y}_i)(y_j^k - \bar{y}_j)\rangle\right]\right\}}{\left[\frac{1}{M}\sum_{m=1}^{M}(y_i^m - \bar{y}_i)^2\right]\left[\frac{1}{M}\sum_{k=1}^{M}(y_j^m - \bar{y}_j)^2\right]}$$

Using the facts that $\langle y_i^m \zeta_i^m \rangle = \langle y_i^m \zeta_i^k \rangle = 0$ and $\langle \zeta_i^m \zeta_j^k \rangle = \delta_{mk} \langle \zeta_i^m \zeta_j^m \rangle$, Equation (21) simplifies to $$\{R_a\}_{ij} = \frac{\left\{\left[\frac{1}{M^2}\sum_{m=1}^{M}\langle ((y_i^m - \bar{y}_i)(y_j^m - \bar{y}_j))\langle \zeta_i^m \zeta_j^m \rangle\rangle\right]\right\}}{\left[\frac{1}{M}\sum_{m=1}^{M}(y_i^m - \bar{y}_i)^2\right]\left[\frac{1}{M}\sum_{k=1}^{M}(y_j^k - \bar{y}_j)^2\right]} \quad (22)$$

$$= \frac{\left\{\left[\frac{1}{M}\sum_{m=1}^{M}\left(\langle (y_i^m - \bar{y}_i)(y_j^m - \bar{y}_j)\rangle \frac{\langle \zeta_i^m \zeta_j^m \rangle}{M}\right)\right]\right\}}{\left[\frac{1}{M}\sum_{m=1}^{M}(y_i^m - \bar{y}_i)^2\right]\left[\frac{1}{M}\sum_{m=1}^{M}(y_j^m - \bar{y}_j)^2\right]}$$

Using Equation (15) in Equation (22) gives $$\{R_a\}_{ij} = \frac{\langle (y_i^m - \bar{y}_i)(y_j^m - \bar{y}_j)\rangle \{R_b\}_{ij}}{\left[\frac{1}{M}\sum_{m=1}^{M}(y_i^m - \bar{y}_i)^2\right]\left[\frac{1}{M}\sum_{m=1}^{M}(y_j^M - \bar{y}_j)^2\right]} \quad (23)$$

$$\approx \frac{\left\{\sum_{m=1}^{M}\frac{(y_i^m - \bar{y}_i)(y_j^m - \bar{y}_j)}{M-1}\right\}\{R_b\}_{ij}}{\left[\frac{1}{M-1}\sum_{m=1}^{M}(y_i^m - \bar{y}_i)^2\right]\left[\frac{1}{M-1}\sum_{m=1}^{M}(y_j^M - \bar{y}_j)^2\right]}$$

To get Equation (23) into matrix form, we first define the matrix Y such that $$\{Y\}_{ij} = \left\{\sum_{m=1}^{M}\frac{(y_i^m - \bar{y}_i)(y_j^m - \bar{y}_j)}{M-1}\right\} \quad (24)$$

Let the diagonal matrix D list the inverse of the diagonal elements of Y such that $$D = \{\text{diag}(Y)\}^{-1} \quad (25)$$

Equation (23) may then be rewritten in the matrix form $$R_a \approx D(Y \odot R_b)D \quad (26)$$

where $\odot$ denotes the elementwise matrix product. Note that Equation (26) states that each element of $R_a$ is directly proportional to a corresponding element of $R_b$. Consequently, just as the elements of $R_b$ tend to zero as the number of training data events M tends to infinity, the elements of $R_a$ will also tend to zero as M→∞.

Thus, in accordance with the present invention, with the MOS regression coefficients, the prior estimates of the regression coefficients, and the covariances $G_a$, $G_b$, $R_a$, and $R_b$ known, an improved set of regression coefficients $a_i$ and $b_i$, i.e., $a_i^{FMOS}$ and $b_i^{FMOS}$, can be obtained in accordance with Equation (3) set forth above:

$$a^{FMOS} = a^{prior} + G_a(G_a + R_a)^{-1}(a^{MOS} - a^{prior}),$$

$$b^{FMOS} = b^{prior} + G_b(G_b + R_b)^{-1}(b^{MOS} - b^{prior})$$

These improved regression coefficients in turn can be used to provide an improved statistical relationship between the forecast at the ith grid point $f_i^k$ and the observation $y_i^k$ at the ith grid point from the FMOS coefficients $a_i^{FMOS}$ and $b_i^{FMOS}$ at the ith grid point where:

$$f_i^k = a_i^{FMOS} y_i^k + b_i^{FMOS} + \epsilon_i^k. \quad (27)$$

Equation (27) represents an improved estimate of the relationship between observations and forecasts than that obtained using MOS coefficients because FMOS coefficients are more accurate than MOS coefficients. Using the methods of Bishop and Shanley (2008), supra, Equation (27) can be used to improve the accuracy and reliability of probabilistic forecasts of weather.

It will be noted here that in some embodiments of the present invention, all of $a^{MOS}$, $b^{MOS}$, $a^{prior}$, $b^{prior}$, $G_a$ and $G_b$, and $R_a$ and $R_b$ may already have been computed and stored in an internal or external memory or other storage medium, so that they need simply to be loaded as inputs into a computer programmed with appropriate software which can then estimate the $a^{FMOS}$ and $b^{FMOS}$ coefficients using the input values. In other embodiments, the values of $a^{MOS}$ and $b^{MOS}$ and $a^{prior}$ and $b^{prior}$ may have been previously computed and loaded as inputs, with $G_a$ and $G_b$, $R_a$ and $R_b$ being computed as part of the process of estimating the $a^{FMOS}$ and $b^{FMOS}$ coefficients. In still other embodiments, none of $a^{MOS}$, $b^{MOS}$, $G_a$ and $G_b$, $R_a$ and $R_b$ may have been already computed so that all of $a^{MOS}$, $b^{MOS}$, $G_a$ and $G_b$, $R_a$ and $R_b$ are computed during the process of estimating the $a^{FMOS}$ and $b^{FMOS}$ coefficients.

To test the FMOS approach, random correlated fields of true values $y^T=[y_1 y_2, \ldots, y_n]$ were created. An example of such a random field of true values is shown in FIG. 1, which illustrates a simulated true state of a 2-dimensional wind component in m/s across idealized weather fields having a scale of 1000 km. From these true values, corresponding forecast values $f^T=[f_1, f_2, \ldots, f_n]$ were created at each grid point using the true values of spatially varying fields of a and b in Equation (1). To give these fields meteorological relevance they were made to propagate from West to East and evolve in time in a way that is qualitatively similar to the way meteorological fields of, for example, temperature, evolve with time. In this way, time series of pairs of observations and forecasts that obey Equation (1) could be easily created for testing the MOS and FMOS approaches for estimating the coefficients a and b from the data fields. The fields together with the MOS fields were also used to test the aforementioned methods for estimating $G_a$ and $G_b$, $R_a$, and $R_b$.

The beneficial effects of using the method of the present invention are clearly illustrated by the plots shown in FIGS. 2A-2H and FIGS. 3A-3H.

As noted above, FIGS. 2A-2H illustrate aspects of the differences between the MOS and FMOS estimates of the slope coefficient a obtained from 16 trials/events. FIGS. 3A-3H illustrate corresponding aspects between the MOS and FMOS estimates of the slope coefficient b.

Each of the 16 trials produces an observation y and a forecast f at each grid point of the model domain. From these 16 data pairs, attempts were made to estimate the unknown coefficients using the MOS method according to Equation (2) set forth above. The results of these estimates are shown in FIGS. 2A-2B and 3A-3B.

Figure 2A:
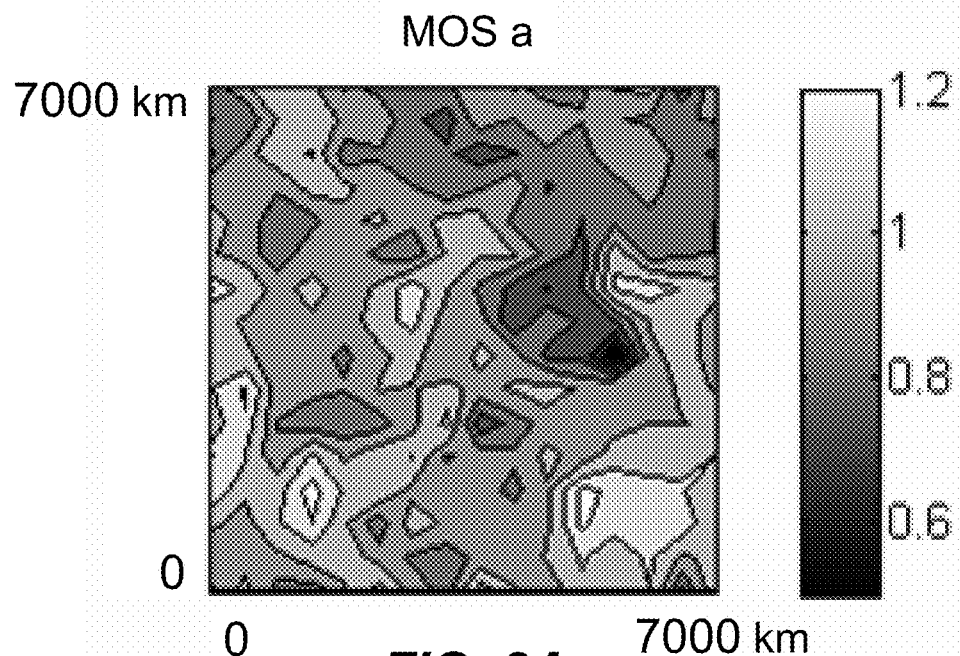
FIGS. 2A-2H illustrate aspects of the differences between the MOS and FMOS estimates of the slope coefficient a obtained from 16 trials/events.
Figure 2B:
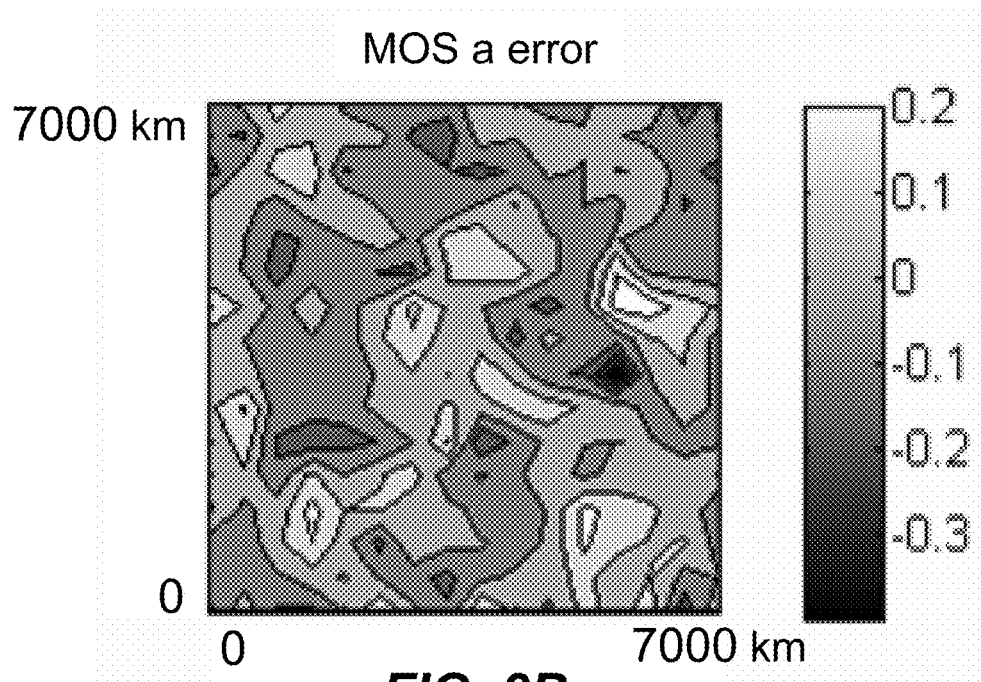
Figure 2C:
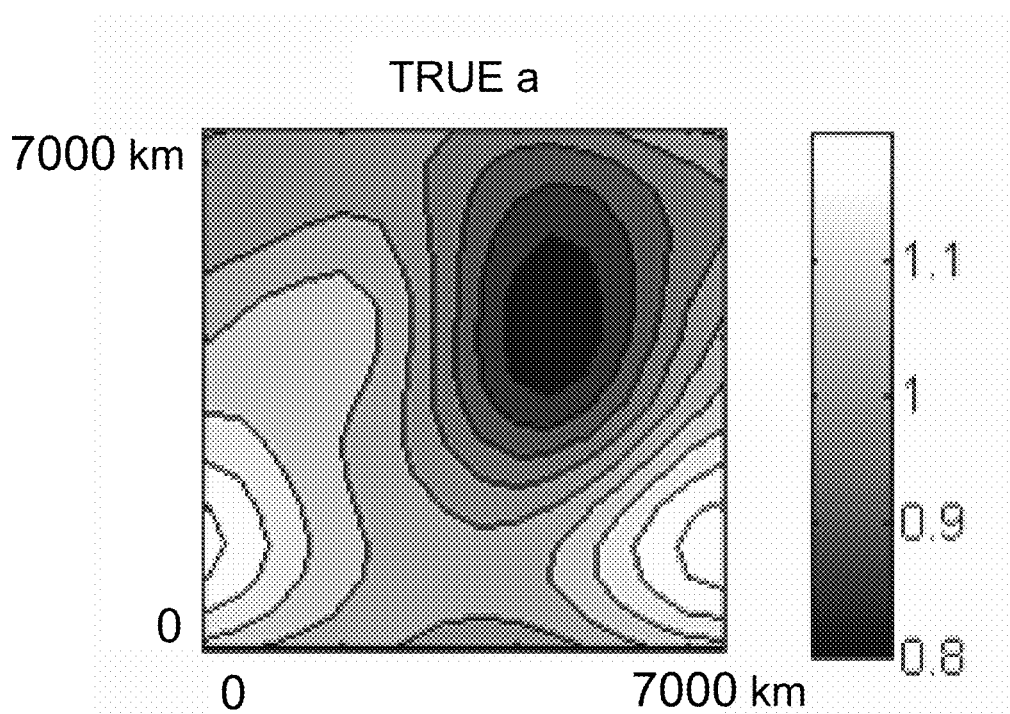
Figure 2D:
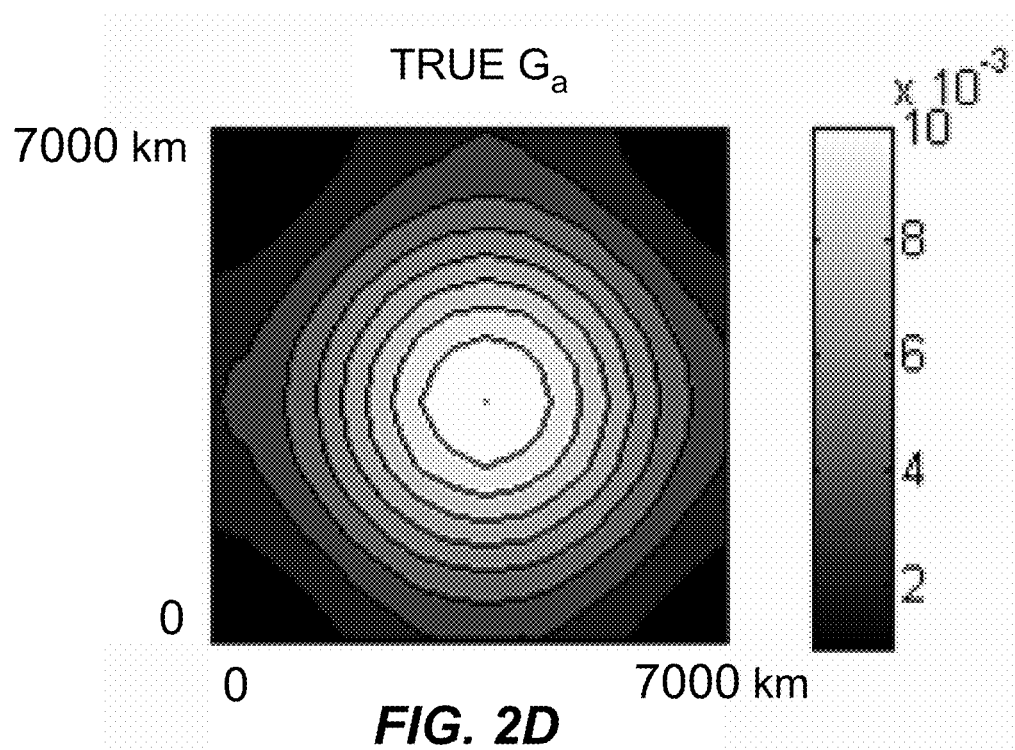
Figure 3A:
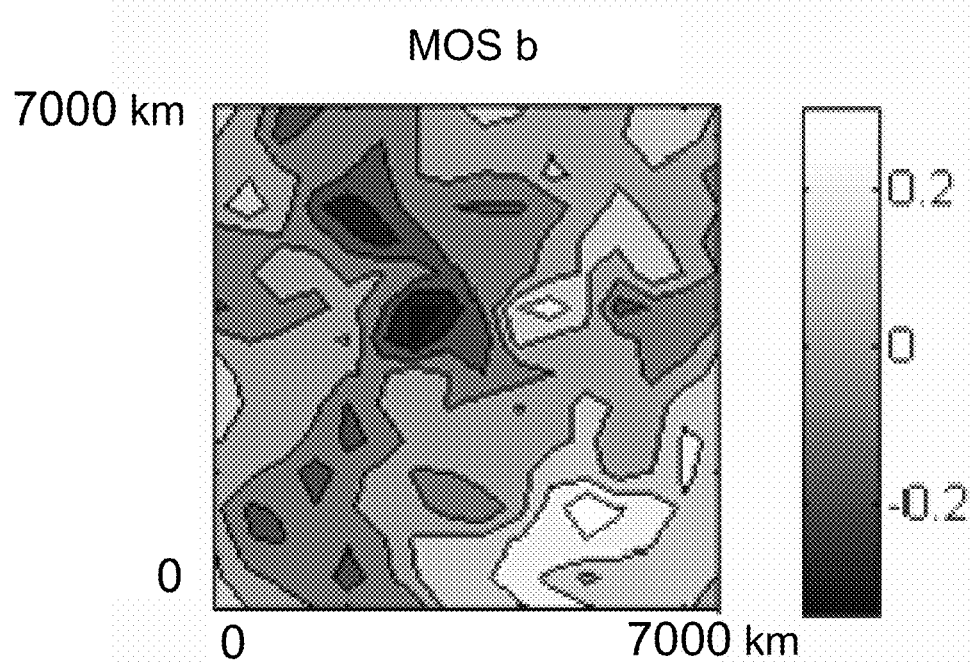
FIGS. 3A-3H illustrate corresponding aspects of the differences between the MOS and the FMOS estimates of the slope coefficient b. Thus.
Figure 3B:
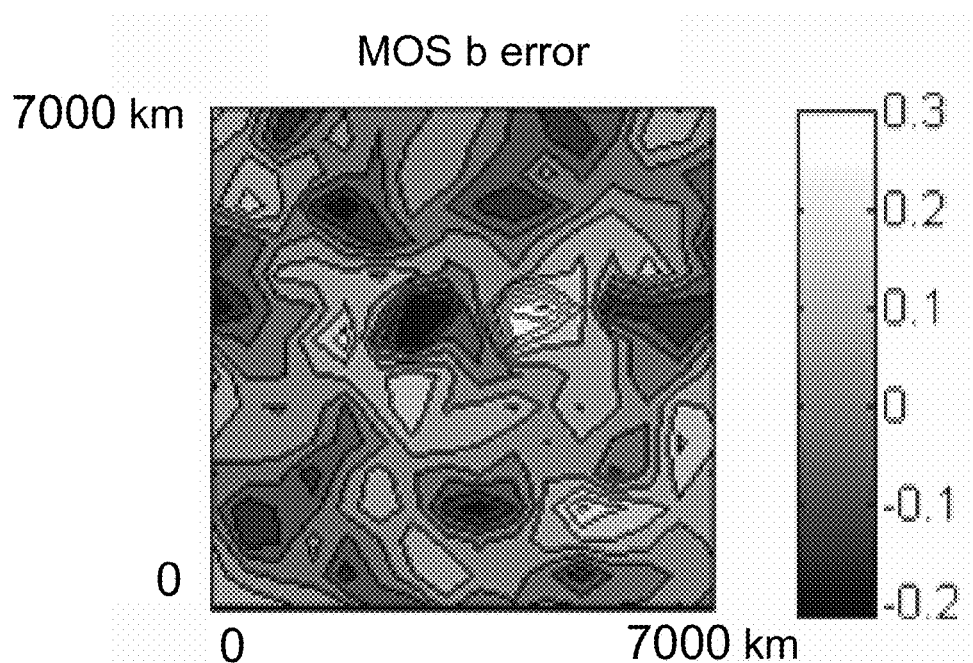
Figure 3C:
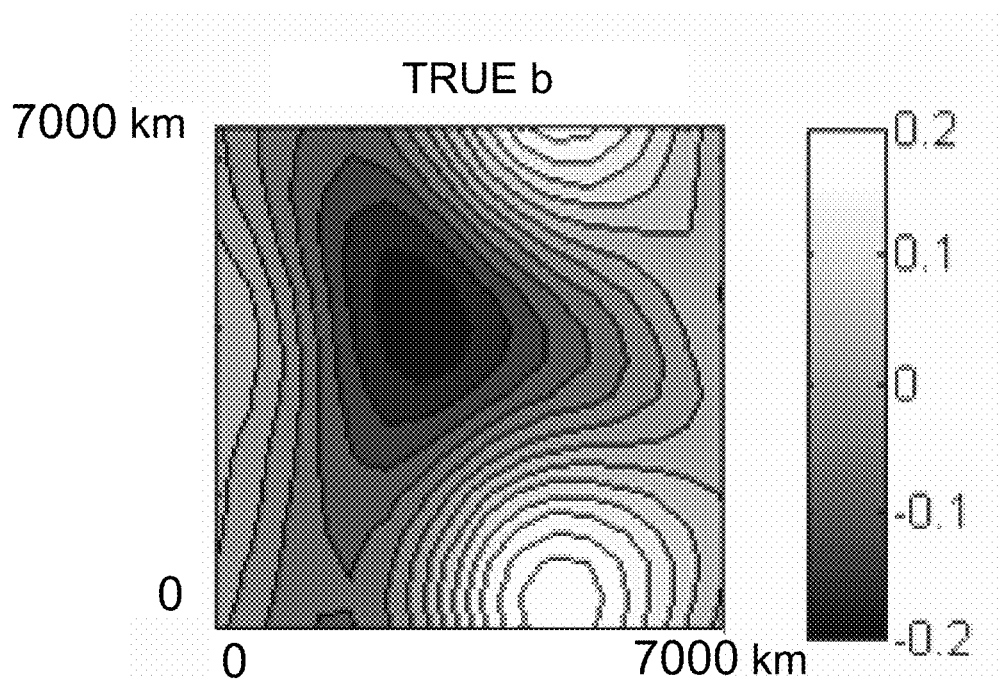
Figure 3D:
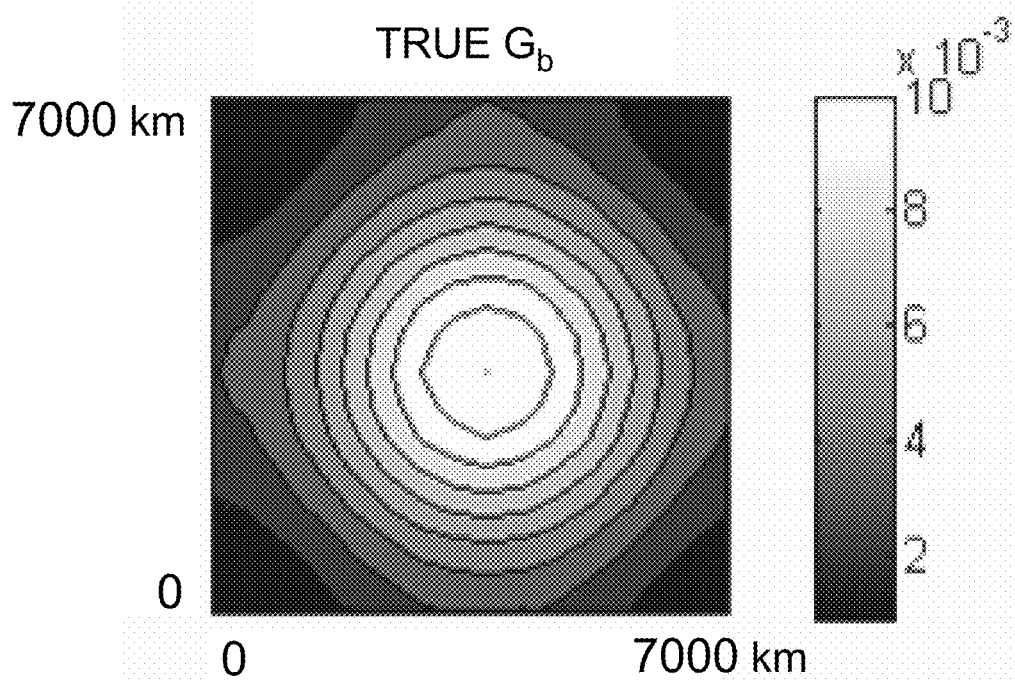

FIGS. 2C and 3C are plots of an exemplary true a-field and an exemplary true b-field obtained using a minor adjustment of the method described in the appendix of Bishop and Hodyss (2007). See C. H. Bishop and D. Hodyss, "Flow adaptive moderation of spurious ensemble correlations and its use in ensemble based data assimilation." *Quart. J. Roy. Met. Soc.* 133, pp. 2029-2044 (2007). FIGS. 2D and 3D shows the true spatial covariance function of the a- and b-fields shown in FIGS. 2C and 3C, respectively, and are equivalent to an error covariance function of the prior estimates of a and b that sets a and b equal to unity at all grid points.

Figure 2E:
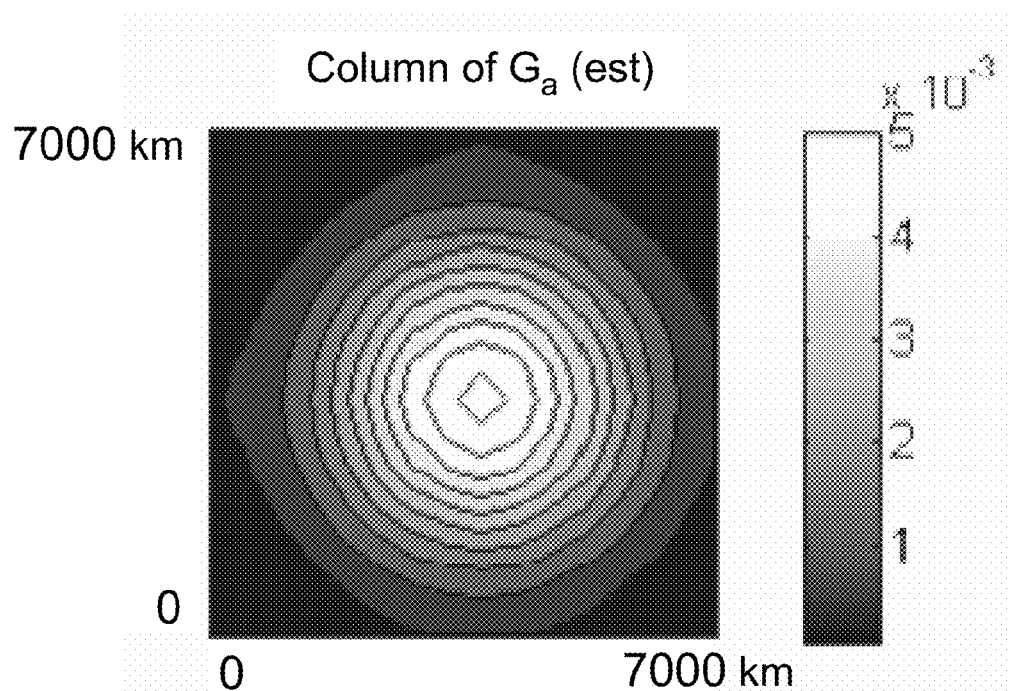
Figure 2F:
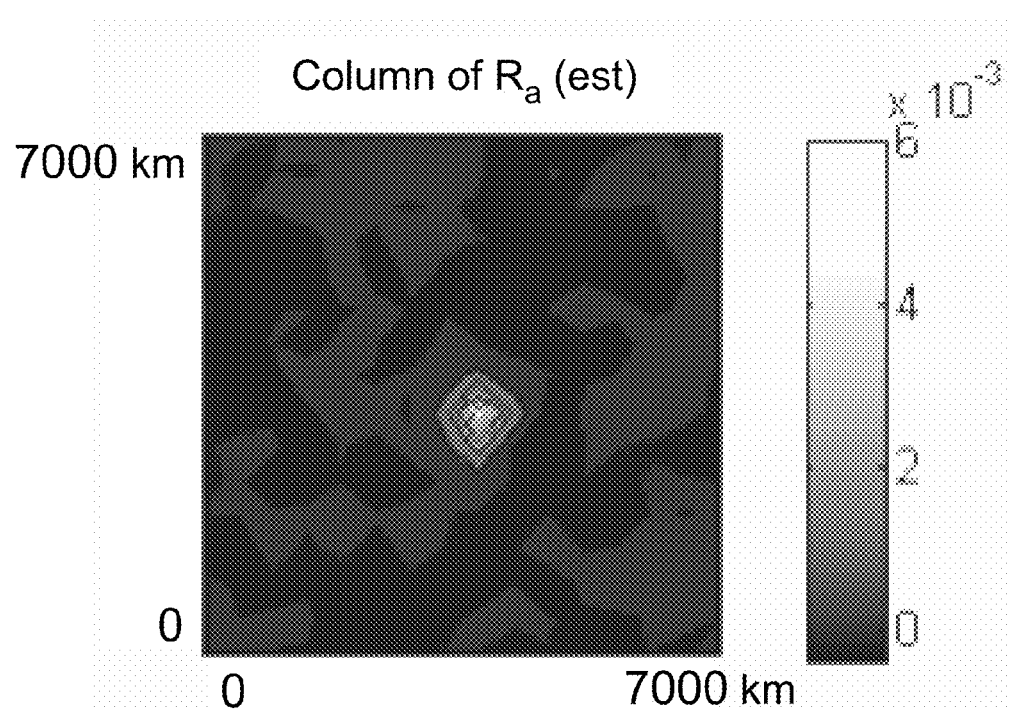
Figure 2G:
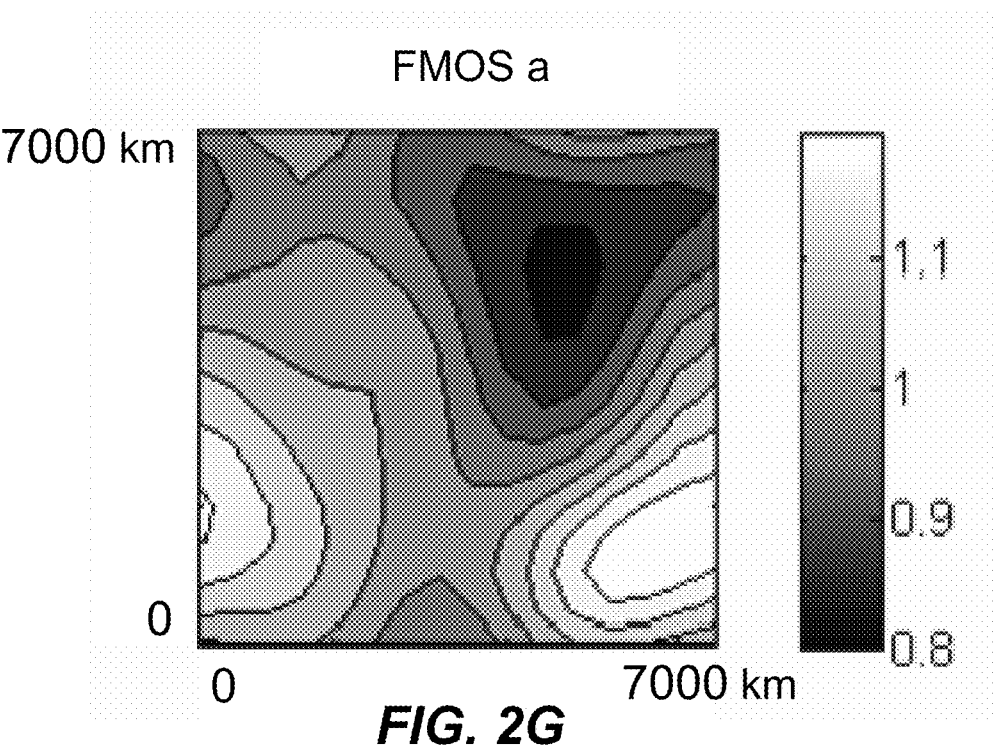
Figure 3E:
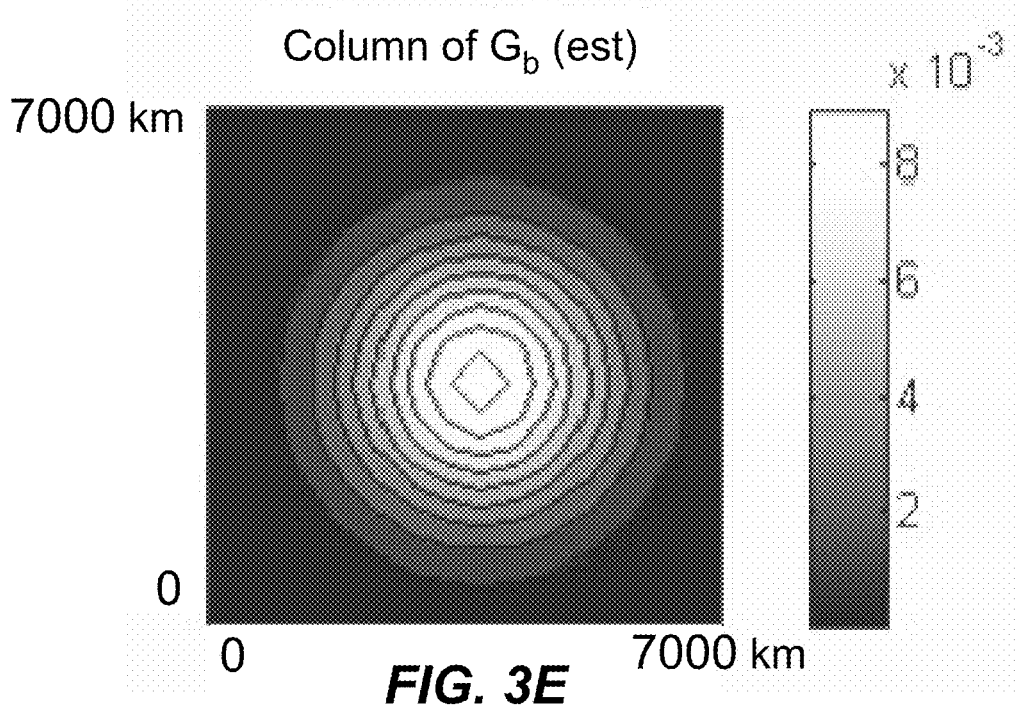
Figure 3F:
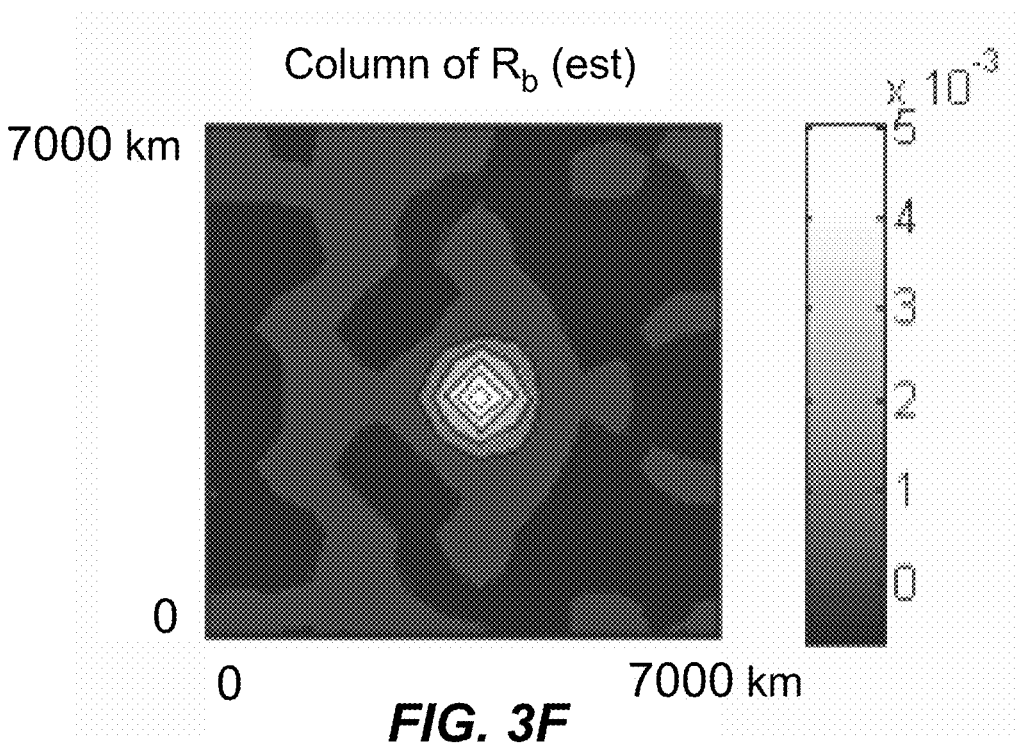
Figure 3G:
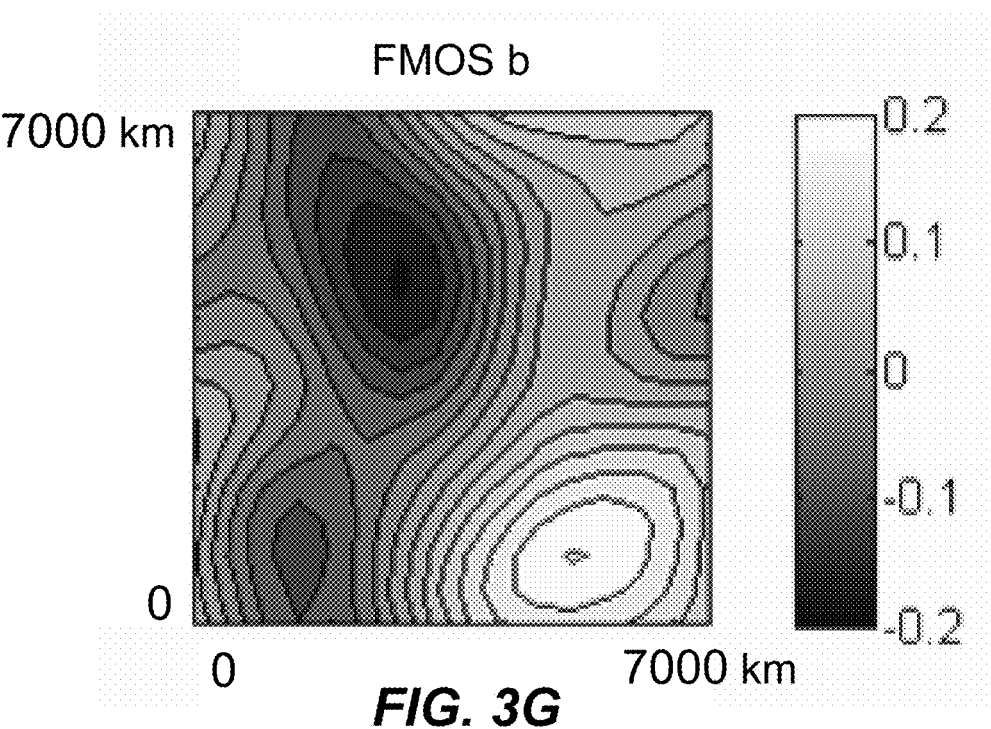
Figure 3H:
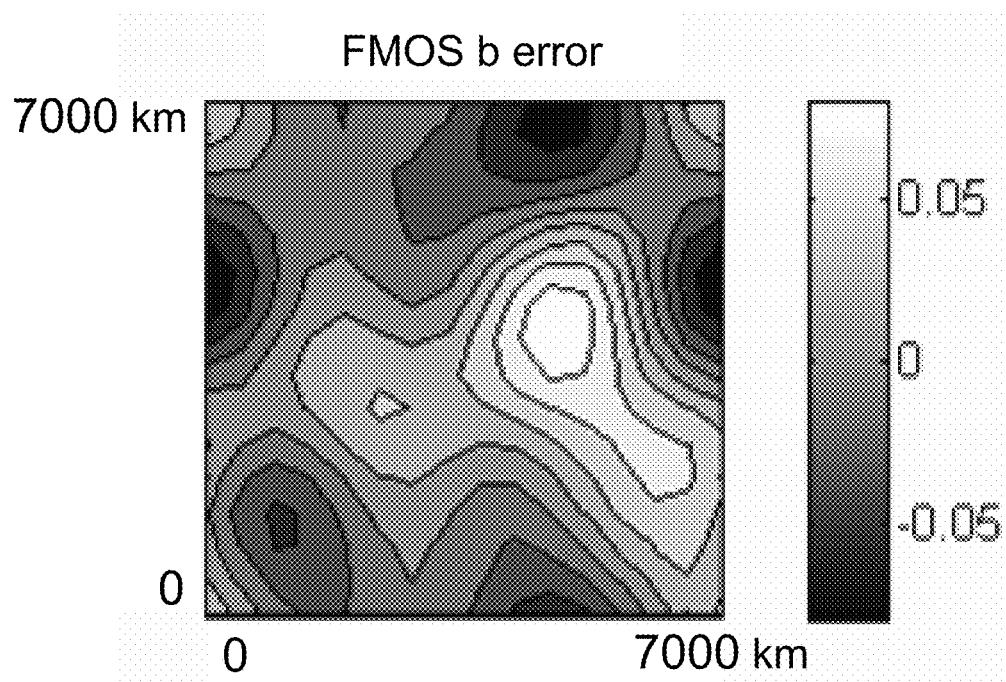

FIGS. 2E and 2F show plots of $G_a$, the estimated error covariance function of the prior estimates of a (FIG. 2E), and $R_a$, the estimated error covariance function of the MOS estimates of a (FIG. 2F), with FIGS. 3E and 3F showing the corresponding plots for $G_b$ and $R_b$.

FIGS. 2A/3A and 2B/3B illustrate aspects of the MOS estimates of the coefficients a and b obtained using the methods of the prior art. Note the noisy nature of the a and b fields shown in FIGS. 2A and 3A as compared with the true fields shown in FIGS. 2C and 3C. In contrast, the FMOS estimates of the coefficients a and b obtained using the methods described herein are smooth, and resemble the plots of the true a and b fields shown in FIGS. 2C and 3C.

Figure 2H:
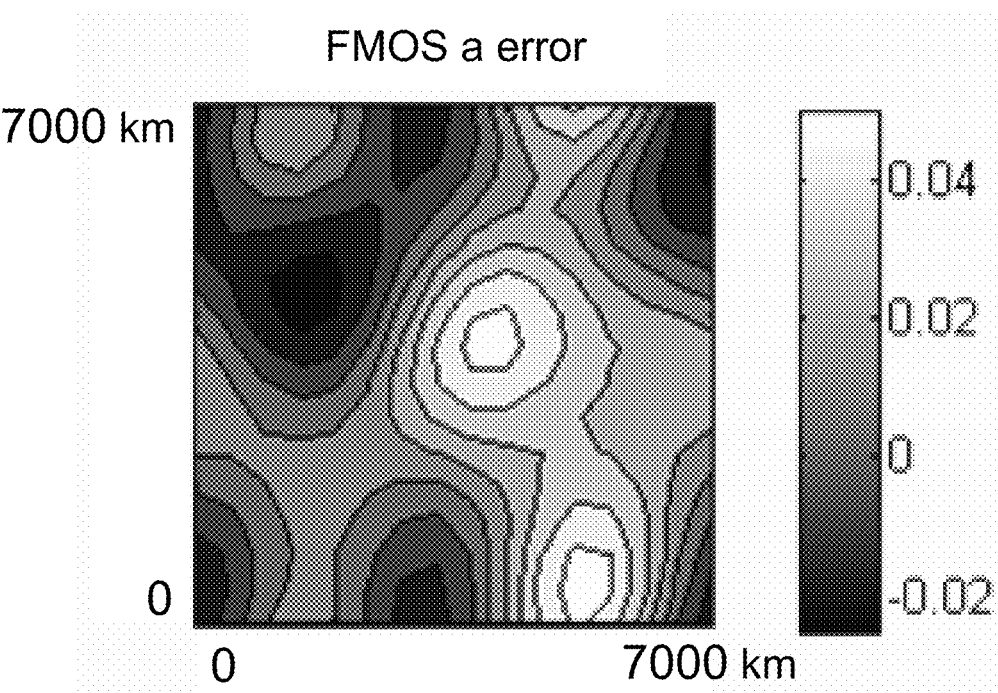

In addition, a comparison of the error of the FMOS estimates of a and b shown in FIGS. 2H/3H with the error of the MOS estimates shown in FIGS. 2B/3B shows that the FMOS errors are about an order of magnitude smaller than the MOS estimate. A comparison of these Figures shows that the maximum errors incurred by the MOS estimate are more than 3-10 times larger than those incurred by the FMOS estimate. For example, the error of the $a_i^{MOS}$ field illustrated in FIG. 2B shows error extrema with magnitudes greater than 0.2, and in fact shows mean square errors (mse) of the MOS estimates that are 19 times larger than the mse of the FMOS estimate shown in FIG. 2H. The MOS estimate of the regression coefficients based on 16 events is of little practical use because the noise (error) is larger than the signal. On the other hand, the error obtained from the FMOS estimates shown in FIG. 2F have maximum magnitudes of 0.04, which is much smaller than the 0.2 amplitude variations of $a_i$. Thus, as can readily be appreciated, the FMOS estimates of the regression coefficients in accordance with the present invention represent a significant improvement over the MOS estimates for use with small data sets.

In addition, to test the statistical significance of the superiority of FMOS over MOS, 16 independent trials were performed in which $\langle \epsilon_i^2 \rangle = 10 \langle (a_i y_i)^2 \rangle = 10 \langle (b_i)^2 \rangle$. In other words, the variance of the random component of forecast error $\epsilon_i$ in Equation (27) was made to be 10 times larger than the variance of the signal. It was found that MOS mse exceeded FMOS mse for the slope parameter "a" by a factor between 3.5 and 57.5. The mean of this superiority factor over the 16 trials was 15.3. In the same set of independent trials, MOS mse exceeded FMOS mse for the intercept parameter "b" by a factor between 2.4 and 9.6. The mean of this superiority factor was 6.1. Note that FMOS was superior to MOS in every one of the 16 trials for both parameters. The probability of this happening by pure chance if FMOS was no better than MOS is $0.5^{16} = 1.5 \times 10^{-5}$. Hence, the null hypothesis that FMOS is not superior to MOS can be rejected with a confidence level of 99.999%.

An additional 16-trial test was performed in which the variance of the random component of forecast error in Equation (27) was reduced by an order of magnitude so that $\langle \epsilon_i^2 \rangle = \langle (a_i y_i)^2 \rangle = \langle (b_i)^2 \rangle$. In this case, MOS mse exceeded FMOS mse for the slope parameter "a" by a factor between 3.8 and 16.7. The mean of this superiority factor was 7.8. In the same set of independent trials, MOS mse exceeded FMOS mse for the intercept parameter "b" by a factor between 1.5 and 5.8. The mean of this superiority factor was 3.7. Note that FMOS was superior to MOS in every one of the 16 trials. Since the probability of this happening by pure chance if FMOS was no better than MOS is $0.5^{16} = 1.5 \times 10^{-5}$. Hence, the null hypothesis that FMOS is not superior to MOS can again be rejected with a confidence level of 99.999%.

Comparison of the first 16 trials with the second set of 16 trials shows that the extent of superiority of FMOS over MOS increases as the magnitude of the systematic part of forecast error is reduced relative to the random part of forecast error.

Thus, the use of the FMOS method of the present invention has numerous advantages. For example, its estimates of regression coefficients are more accurate, particularly when the training data set is small. Moreover, if properly configured, the results using the FMOS method of the present invention will be equivalent to those using MOS in the limit of an infinite data training set. This is a desirable feature because, in the limit of a very large data set, MOS is guaranteed to recover the true coefficients.

It will be appreciated by one skilled in the art that one or more aspects of a method for providing stabilized and spatially smooth regression coefficients for weather forecast error correction from small training data sets as described herein can be accomplished by one or more processors executing one or more sequences of one or more computer-readable instructions read into a memory of one or more computers from volatile or non-volatile computer-readable media capable of storing and/or transferring computer programs or computer-readable instructions for execution by one or more computers. Volatile media can include a memory such as a dynamic memory in a computer. Non-volatile computer readable media that can be used can include a compact disk, hard disk, floppy disk, tape, magneto-optical disk, PROM (EPROM, EEPROM, flash EPROM), SRAM, SDRAM, or any other magnetic medium; punch card; paper tape; or any other physical medium such as a chemical or biological medium.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A computer-implemented method for estimating a set of regression coefficients for use in estimating a model forecast variable from a small data set, the method including the steps of:
   (a) receiving, using a computer, data of an n-vector $a^{MOS}$ and an n-vector $b^{MOS}$ the elements of $a^{MOS}$ and $b^{MOS}$ comprising a set of modeled output statistics (MOS) estimates of the true values of forecast correction coefficients a and b;
   (b) receiving, using the computer, data of an n-vector $a^{prior}$ and an n-vector $b^{prior}$, the elements of $a^{prior}$ and $b^{prior}$ comprising a set of prior estimates of forecast correction coefficients a and b;
   (c) estimating a spatial covariance matrix $G_a$ for $a^{prior}$ and a spatial covariance matrix $G_b$ for $b^{prior}$;
   (i) wherein the spatial covariance matrix $G_a$ is estimated as $G_a = E(\text{diag}(g))E^T$,
      where E is an n×n matrix listing a real set of discrete orthonormal basis functions for domain of interest, $E^T$ is the transpose of E, and diag(g) is a diagonal matrix whose non-zero elements are given by $$g_{k,l} = B\exp(-b^2(k^2 + l^2))$$

and $$g^T = [g_{k,l}, k=1, \ldots, n_k, l=1, \ldots, n_l]$$

in which k and l are sinusoidal basis functions with a wavenumber k in the x-direction and a wavenumber l in the y-direction, and B and b minimize the function $$J = \frac{1}{2}\sum_{k=1}^{n_k}\sum_{l=1}^{n_l}((g_{k,l}) - (d_{k,l}))^2$$

by setting $$\frac{\partial J}{\partial B} = \sum_{k=1}^{n_k}\sum_{l=1}^{n_l}\frac{\partial g_{k,l}}{\partial B}((g_{k,l}) - (d_{k,l})) = 0$$

and $$\frac{\partial J}{\partial (b^2)} = \sum_{k=1}^{n_k}\sum_{l=1}^{n_l}\frac{\partial g_{k,l}}{\partial (b^2)}((g_{k,l}) - (d_{k,l})) = 0,$$

where $d_{k,l}$ is the element of the vector $d=[E^T(a^{prior}-a^{MOS})] \odot [E^T(a^{prior}-a^{MOS})]$ corresponding to the wavenumber k and the wavenumber l, where the symbol $\odot$ indicates the elementwise product, and where the derivatives of J are of the form $$\frac{\partial J}{\partial B} = \sum_{k=1}^{n_k}\sum_{l=1}^{n_l}\exp[-b^2(k^2+l^2)](B\exp[-b^2(k^2+l^2)] - (d_{k,l})) = 0$$

and $$\frac{\partial J}{\partial (b^2)} = \sum_{k=1}^{n_k}\sum_{l=1}^{n_l}-(k^2+l^2)b\exp[-b^2(k^2+l^2)](B\exp[-b^2(k^2+l^2)] - (d_{k,l})) =$$

$$0 \Rightarrow \sum_{k=1}^{n_k}\sum_{l=1}^{n_l}-(k^2+l^2)\exp[-b^2(k^2+l^2)](B\exp[-b^2(k^2+l^2)] - (d_{k,l})) = 0;$$

and (ii) wherein the spatial covariance matrix $G_b$ is estimated as $G_b = E(\text{diag}(g^b))E^T$,
   where $\text{diag}(g^b)$ is a diagonal matrix whose non-zero elements are given by $$g^b_{k,l} = A\exp(-a^2(k^2+l^2))$$

and $$g^{bT} = [g^b_{k,l}, k=1, \ldots, n_k, l=1, \ldots, n_l]$$

where k and l are the sinusoidal basis functions with the wavenumber k and the wavenumber l, and where A and a minimize the function $$J^b = \frac{1}{2}\sum_{k=1}^{n_k}\sum_{l=1}^{n_l}((g^b_{k,l}) - (d^b_{k,l}))^2$$

by setting $$\frac{\partial J^b}{\partial A} = \sum_{k=1}^{n_k}\sum_{l=1}^{n_l}\frac{\partial g^b_{k,l}}{\partial A}((g^b_{k,l}) - (d^b_{k,l})) = 0$$

and $$\frac{\partial J^b}{\partial (a^2)} = \sum_{k=1}^{n_k}\sum_{l=1}^{n_l}\frac{\partial g^b_{k,l}}{\partial (a^2)}((g^b_{k,l}) - (d^b_{k,l})) = 0,$$

where $d^b_{k,l}$ is an element of the vector $d^b = [E^T(b^{prior}-b^{MOS})] \odot [E^T(b^{prior}-b^{MOS})]$ corresponding to the wavenumber k and the wavenumber l and the derivatives of $J^b$ take the form $$\frac{\partial J^b}{\partial A} = \sum_{k=1}^{n_k}\sum_{l=1}^{n_l}\exp[-a^2(k^2+l^2)](A^b\exp[-a^2(k^2+l^2)] - (d^b_{k,l})) = 0$$

and $$\frac{\partial J^b}{\partial (a^2)} = \sum_{k=1}^{n_k}\sum_{l=1}^{n_l}-(k^2+l^2)A\exp[-a^2(k^2+l^2)]$$

$$(A\exp[-a^2(k^2+l^2)] - (d^b_{k,l})) = 0 \Rightarrow \sum_{k=1}^{n_k}\sum_{l=1}^{n_l}-(k^2+l^2)\exp[-a^2(k^2+l^2)](A\exp[-a^2(k^2+l^2)] - (d^b_{k,l})) = 0;$$

(d) estimating, using the computer, data of a spatial error covariance matrix $R_a$ for $a^{MOS}$ and a spatial error covariance matrix $R_b$ for $b^{MOS}$, each element $\{R_a\}_{ij}$ of $R_a$ and each element $\{R_b\}_{ij}$ of $R_b$ being estimated over a set of m=1 to M events, M being smaller than a number of points of interest in a spatial grid, (i) wherein $R_b$ is estimated using the relation $$R_b \approx E\left\{\text{diag}\left\{E^T\left\{\frac{\frac{1}{M-1}\sum_{m=1}^{M}(\zeta^m-\bar{\zeta})(\zeta^m-\bar{\zeta})}{M}\right\}E\right\}\right\}E^T$$

$\xi^m \approx f^m - a^{MOS}\odot y^m - b^{MOS}$ gives a vector of differences between a forecast $[(f_m)^T = [f_1^m, f_2^m, \ldots, f_n^m]]$ and a MOS prediction $f_m^{MOS} = a^{MOS}\odot y^m + b^{MOS}$ of a forecast from an mth event and $$\bar{\zeta} = \frac{1}{M}\sum_{m=1}^{M}\zeta^m,$$

and wherein $\{R_b\}_{ij}$ denotes an element of the matrix $R_b$ lying on its ith row and jth column;

and (ii) wherein $R_a$ is estimated as $R_a \approx D(Y\odot R_b)D$, where $$\{Y\}_{ij} = \left\{\sum_{m=1}^{M}\frac{(y_i^m-\bar{y}_i)(y_j^m-\bar{y}_j)}{M-1}\right\}, \text{ and } D = \{\text{diag}(Y)\}^{-1},$$

and wherein each element $\{R_a\}_{ij}$ of error covariance matrix $R_a$ is estimated as $$\{R_a\}_{ij} = \frac{\langle(y_i^m-\bar{y}_i)(y_j^m-\bar{y}_j)\rangle\{R_b\}_{ij}}{\left[\frac{1}{M}\sum_{m=1}^{M}(y_i^m-\bar{y}_i)^2\right]\left[\frac{1}{M}\sum_{m=1}^{M}(y_j^M-\bar{y}_j)^2\right]}$$

$$= \frac{\left\{\sum_{m=1}^{M}\frac{(y_i^m-\bar{y}_i)(y_j^m-\bar{y}_j)}{M-1}\right\}\{R_b\}_{ij}}{\left[\frac{1}{M-1}\sum_{m=1}^{M}(y_i^m-\bar{y}_i)^2\right]\left[\frac{1}{M-1}\sum_{m=1}^{M}(y_j^M-\bar{y}_j)^2\right]},$$

where $\bar{y}_i$ is a sample mean of a verifying variable $y_i^m$ over a plurality of m events; and (e) transforming the data of $a^{MOS}$, $b^{MOS}$, $a^{prior}$, $b^{prior}$, $G_a$, $G_b$, $R_a$, and $R_b$ into a set of estimated regression coefficients $a^{FMOS}$ and $b^{FMOS}$, wherein $a^{FMOS} = a^{prior} + G_a(G_a + R_a)^{-1}(a^{MOS} - a^{prior})$; and $b^{FMOS} = b^{prior} + G_b(G_b + R_b)^{-1}(b^{MOS} - b^{prior})$.

2. A computer-implemented method for estimating a set of regression coefficients for use in estimating a model forecast variable from a small data set, the method including the steps of:

(a) receiving, using a computer, data of an n-vector $a^{MOS}$ and an n-vector $b^{MOS}$, the elements of $a^{MOS}$ and $b^{MOS}$ comprising a set of modeled output statistics (MOS) estimates of the true values of forecast correction coefficients a and b;

(b) receiving, using the computer, data of an n-vector $a^{prior}$ and an n-vector $b^{prior}$, the elements of $a^{prior}$ and $b^{prior}$ comprising a set of prior estimates of forecast correction coefficients a and b;

(c) receiving, using the computer, data of a spatial covariance matrix $G_a$ for $a^{prior}$ and a spatial covariance matrix $G_b$ for $b^{prior}$;

(d) estimating, using the computer, data of a spatial error covariance matrix $R_a$ for $a^{MOS}$ and a spatial error covariance matrix $R_b$ for $b^{MOS}$ each element $\{R_a\}_{ij}$ of $R_a$ and each element $\{R_b\}_{ij}$ of $R_b$ being estimated over a set of m=1 to M events, M being smaller than a number of points of interest in a spatial grid, (i) wherein $R_b$ is estimated using the relation $$R_b \approx E\left\{\text{diag}\left\{E^T\left\{\frac{\frac{1}{M-1}\sum_{m=1}^{M}(\zeta^m-\bar{\zeta})(\zeta^m-\bar{\zeta})}{M}\right\}E\right\}\right\}E^T$$

where $\xi^m \approx f^m - a^{MOS}\odot y^m - b^{MOS}$ gives a vector of differences between a forecast $[(f_m)^T = [f_1^m, f_2^m, \ldots, f_n^m]]$, where the symbol $\odot$ indicates the elementwise product, and a MOS prediction $f_m^{MOS} = a^{MOS}\odot y^m + b^{MOS}$ of a forecast from an mth event and $$\bar{\zeta} = \frac{1}{M}\sum_{m=1}^{M}\zeta^m,$$

wherein $\{R_b\}_{ij}$ denotes an element of the matrix $R_b$ lying on its ith row and jth column; and (ii) wherein $R_a$ is estimated as $R_a \approx D(Y\odot R_b)D$, where $$\{Y\}_{ij} = \left\{\sum_{m=1}^{M}\frac{(y_i^m-\bar{y}_i)(y_j^m-\bar{y}_j)}{M-1}\right\}, \text{ and}$$

$D = \{\text{diag}(Y)\}^{-1},$ and wherein each element $\{R_a\}_{ij}$ of error covariance matrix $R_a$ is estimated as $$\{R_a\}_{ij} = \frac{\langle(y_i^m-\bar{y}_i)(y_j^m-\bar{y}_j)\rangle\{R_b\}_{ij}}{\left[\frac{1}{M}\sum_{m=1}^{M}(y_i^m-\bar{y}_i)^2\right]\left[\frac{1}{M}\sum_{m=1}^{M}(y_j^M-\bar{y}_j)^2\right]}$$

$$\approx \frac{\left\{\sum_{m=1}^{M}\frac{(y_i^m-\bar{y}_i)(y_j^m-\bar{y}_j)}{M-1}\right\}\{R_b\}_{ij}}{\left[\frac{1}{M-1}\sum_{m=1}^{M}(y_i^m-\bar{y}_i)^2\right]\left[\frac{1}{M-1}\sum_{m=1}^{M}(y_j^m-\bar{y}_j)^2\right]},$$

where $\bar{y}_i$ is a sample mean of a verifying variable $y_i^m$ over a plurality of m events; and (e) transforming data of $a^{MOS}$, $b^{MOS}$, $a^{prior}$, $b^{prior}$, $G_a$, $G_b$, $R_a$, and $R_b$ into a set of estimated regression coefficients $a^{FMOS}$ and $b^{FMOS}$, wherein $$a^{FMOS} = a^{prior} + G_a(G_a + R_a)^{-1}(a^{MOS} - a^{prior}); \text{ and}$$

$$b^{FMOS} = b^{prior} + G_b(G_b - R_b)^{-1}(b^{MOS} - b^{prior}).$$

3. A computer-implemented method for estimating a set of regression coefficients for use in estimating a model forecast variable $f_i$ from a small data set, including the steps of:

(a) receiving, using a computer, data of an n-vector $a^{MOS}$ and an n-vector $b^{MOS}$, the elements of $a^{MOS}$ and $b^{MOS}$ comprising a set of modeled output statistics (MOS) estimates of the true values of forecast correction coefficients a and b;

(b) receiving, using the computer, data of an n-vector $a^{prior}$ and an n-vector $b^{prior}$ the elements of $a^{prior}$ and $b^{prior}$ comprising a set of prior estimates of forecast correction coefficients a and b;

(c) receiving, using the computer, data of a spatial covariance matrix $G_a$ for $a^{prior}$ and a spatial covariance matrix $G_b$ for $b^{prior}$ (i) wherein the spatial covariance matrix $G_a$ was estimated as $G_a = E(\text{diag}(g))E^T$, where E is an n×n matrix listing a real set of discrete orthonormal basis functions for domain of interest, $E^T$ is the transpose of E, and diag(g) is a diagonal matrix whose non-zero elements are given by $$g_{k,l} = B\exp(-b^2(k^2 + l^2))$$

and $$g^T = [g_{k,l}, k=1, \ldots, n_k, l=1, \ldots, n_l]$$

in which k and l are sinusoidal basis functions with a wavenumber k in the x-direction and a wavenumber l in the y-direction, and B and b minimize the function $$J = \frac{1}{2} \sum_{k=1}^{n_k} \sum_{l=1}^{n_l} ((g_{k,l}) - (d_{k,l}))^2$$

by setting $$\frac{\partial J}{\partial B} = \sum_{k=1}^{n_k} \sum_{l=1}^{n_l} \frac{\partial g_{k,l}}{\partial B}((g_{k,l}) - (d_{k,l})) = 0$$

and $$\frac{\partial J}{\partial (b^2)} = \sum_{k=1}^{n_k} \sum_{l=1}^{n_l} \frac{\partial g_{k,l}}{\partial (b^2)}((g_{k,l}) - (d_{k,l})) = 0,$$

where $d_{k,l}$ is the element of the vector $d = [E^T(a^{prior} - a^{MOS})] \odot [E^T(a^{prior} - a^{MOS})]$ corresponding to the wavenumber k and the wavenumber l, where the symbol $\odot$ indicates the elementwise product, and where the derivatives of J are of the form $$\frac{\partial J}{\partial B} = \sum_{k=1}^{n_k} \sum_{l=1}^{n_l} \exp[-b^2(k^2 + l^2)](B\exp[-b^2(k^2 + l^2)] - (d_{k,l})) = 0$$

and $$\frac{\partial J}{\partial (b^2)} = \sum_{k=1}^{n_k} \sum_{l=1}^{n_l} -(k^2 + l^2)B\exp[-b^2(k^2 + l^2)](B\exp[-b^2(k^2 + l^2)] - (d_{k,l})) =$$

$$0 \Rightarrow \sum_{k=1}^{n_k} \sum_{l=1}^{n_l} -(k^2 + l^2)\exp[-b^2(k^2 + l^2)](B\exp[-b^2(k^2 + l^2)] - (d_{k,l})) = 0;$$

and (ii) wherein the spatial covariance matrix $G_b$ was estimated as $G_b = E(\text{diag}(g^b))E^T$, where diag($g^b$) is a diagonal matrix whose non-zero elements are given by $$g^b_{k,l} = A\exp(-a^2(k^2 + l^2))$$

and $$g^{bT} = [g^b_{k,l}, k=1, \ldots, n_k, l=1, \ldots, n_l]$$

where k and l are the sinusoidal basis functions with the wavenumber k and the wavenumber l, and where A and a minimize the function $$J^b = \frac{1}{2} \sum_{k=1}^{n_k} \sum_{l=1}^{n_l} ((g^b_{k,l}) - (d^b_{k,l}))^2$$

by setting $$\frac{\partial J^b}{\partial A} = \sum_{k=1}^{n_k} \sum_{l=1}^{n_l} \frac{\partial g^b_{k,l}}{\partial A}((g^b_{k,l}) - (d^b_{k,l})) = 0$$

and $$\frac{\partial J^b}{\partial (a^2)} = \sum_{k=1}^{n_k} \sum_{l=1}^{n_l} \frac{\partial g^b_{k,l}}{\partial (a^2)}((g^b_{k,l}) - (d^b_{k,l})) = 0,$$

where $d^b_{k,l}$ is an element of the vector $d^b = [E^T(b^{prior} - b^{MOS})] \odot [E^T(b^{prior} - b^{MOS})]$ corresponding to the wavenumber k and the wavenumber l and the derivatives of $J^b$ take the form $$\frac{\partial J^b}{\partial A} = \sum_{k=1}^{n_k} \sum_{l=1}^{n_l} \exp[-a^2(k^2 + l^2)](A^b\exp[-a^2(k^2 + l^2)] - (d^b_{k,l})) = 0$$

and $$\frac{\partial J^b}{\partial (a^2)} = \sum_{k=1}^{n_k} \sum_{l=1}^{n_l} -(k^2 + l^2)A\exp[-a^2(k^2 + l^2)](A\exp[-a^2(k^2 + l^2)] - (d^b_{k,l})) =$$

$$0 \Rightarrow \sum_{k=1}^{n_k} \sum_{l=1}^{n_l} -(k^2 + l^2)\exp[-a^2(k^2 + l^2)](A\exp[-a^2(k^2 + l^2)] - (d^b_{k,l})) = 0;$$

(d) receiving, using the computer, data of a spatial error covariance matrix $R_a$ for $a^{MOS}$ and a spatial error covariance matrix $R_b$ for $b^{MOS}$, (i) wherein $R_b$ was estimated using the relation $$R_b \approx E\left\{\text{diag}\left\{E^T\left\{\frac{\frac{1}{M-1}\sum_{m=1}^{M}(\zeta^m - \bar{\zeta})(\zeta^m - \bar{\zeta})}{M}\right\}E\right\}\right\}E^T$$

where $\xi^m \approx f^m - a^{MOS} \odot y^m - b^{MOS}$ where gives a vector of differences between a forecast $[(f_m)^T = [f_1^m, f_2^m, \ldots, f_n^m]]$ and a MOS prediction $f_m^{MOS} = a^{MOS} \odot y^m + b^{MOS}$ of a forecast from an mth event and $$\bar{\zeta} = \frac{1}{M}\sum_{m=1}^{M}\zeta^m,$$

and wherein $\{R_b\}_{ij}$ denotes an element of the matrix $R_b$ lying on its ith row and jth column;
and (ii) wherein $R_a$ is estimated as $R_a \approx D(Y \odot R_b)D$, where $$\{Y\}_{ij} = \left\{\sum_{m=1}^{M}\frac{(y_i^m - \bar{y}_i)(y_j^m - \bar{y}_j)}{M-1}\right\}, \text{ and } D = \{\text{diag}(Y)\}^{-1},$$

and wherein each element $\{R_a\}_{ij}$ of error covariance matrix $R_a$ was estimated as $$\{R_a\}_{ij} = \frac{\langle(y_i^m - \bar{y}_i)(y_j^m - \bar{y}_j)\rangle\{R_b\}_{ij}}{\left[\frac{1}{M}\sum_{m=1}^{M}(y_i^m - \bar{y}_i)^2\right]\left[\frac{1}{M}\sum_{m=1}^{M}(y_j^M - \bar{y}_j)^2\right]}$$

$$\approx \frac{\left\{\sum_{m=1}^{M}\frac{(y_i^m - \bar{y}_i)(y_j^m - \bar{y}_j)}{M-1}\right\}\{R_b\}_{ij}}{\left[\frac{1}{M-1}\sum_{m=1}^{M}(y_i^m - \bar{y}_i)^2\right]\left[\frac{1}{M-1}\sum_{m=1}^{M}(y_j^M - \bar{y}_j)^2\right]},$$

where $\bar{y}_i$ is a sample mean of a verifying variable $y_i^m$ over a plurality of m events;

and (e) transforming the data of $a^{MOS}$, $b^{MOS}$, $a^{prior}$, $b^{prior}$, $G_a$, $G_b$, $R_a$, and $R_b$ into a set of estimated regression coefficients $a^{FMOS}$ and $b^{FMOS}$, wherein $$a^{FMOS} = a^{prior} + G_a(G_a + R_a)^{-1}(a^{MOS} - a^{prior}); \text{ and}$$

$$b^{FMOS} = b^{prior} + G_b(G_b + R_b)^{-1}(b^{MOS} - b^{prior}).$$

\* \* \* \* \*